United States Patent
Oettinger et al.

(10) Patent No.: US 7,688,608 B2
(45) Date of Patent: Mar. 30, 2010

(54) REFERENCE VOLTAGE CHANGE IN A DIGITAL POWER SUPPLY

(75) Inventors: Eric Gregory Oettinger, Rochester, MN (US); Mark David Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 130 days.

(21) Appl. No.: 11/967,793

(22) Filed: Dec. 31, 2007

(65) Prior Publication Data

US 2008/0284388 A1 Nov. 20, 2008

Related U.S. Application Data

(60) Provisional application No. 60/939,013, filed on May 18, 2007.

(51) Int. Cl.
*H02M 7/5387* (2007.01)
*H02M 3/24* (2007.01)

(52) U.S. Cl. .......................... 363/132; 393/98

(58) Field of Classification Search ............... 363/17, 363/132, 101, 98
See application file for complete search history.

(56) References Cited

U.S. PATENT DOCUMENTS

| | | | | |
|---|---|---|---|---|
| 5,019,952 A | * | 5/1991 | Smolenski et al. | 363/16 |
| 6,320,769 B2 | * | 11/2001 | Kurokami et al. | 363/56.03 |
| 7,009,852 B2 | * | 3/2006 | Ying et al. | 363/17 |
| 7,099,169 B2 | * | 8/2006 | West et al. | 363/132 |
| 7,330,366 B2 | * | 2/2008 | Lee et al. | 363/101 |

OTHER PUBLICATIONS

Barr, Michael "Indtroduction to Pulse Width Modulation," Netrino, retrieved from www.netrino.com/Publications/Glossary/PWM.php on May 18, 2007.
"Power Factor," LM Photonics Ltd., retrieved from www.lmphotonics.com/pwrfact.htm on May 18, 2007.
Hagen, Mark "In Situ Transfer Function Analysis: Measurement of System Dynamics in a Digital Power Supply," dated Jul. 10, 2006, 7 pages.

* cited by examiner

*Primary Examiner*—Shawn Riley
(74) *Attorney, Agent, or Firm*—William B. Kempler; Wade J. Brady, III; Frederick J. Telecky, Jr.

(57) ABSTRACT

An example disclosed method to handle a reference voltage change in a digital power supply includes receiving a first value associated with a first reference voltage having a first voltage magnitude at a digital signal processor of a digital power supply, comparing the first reference voltage to an output voltage of the digital power supply, controlling the digital power supply based on the comparison between the first reference voltage and the output voltage, receiving a second value associated with a second reference voltage having a second voltage magnitude, determining that the first voltage magnitude is different than the second voltage magnitude, in response to determining that the second voltage magnitude is different than the first voltage magnitude, determining a voltage profile, and controlling the digital power supply based on the voltage profile.

20 Claims, 17 Drawing Sheets

| inject at | measure at | | | | |
|---|---|---|---|---|---|
| | y | u | c | x | e |
| $d_1$ | $\dfrac{GH}{1+GH}$ | $\dfrac{H}{1+GH}$ | $\dfrac{H}{1+GH}$ | $\dfrac{1}{1+GH}$ | $\dfrac{-GH}{1+GH}$ |
| $d_2$ | $\dfrac{G}{1+GH}$ | $\dfrac{1}{1+GH}$ | $\dfrac{-GH}{1+GH}$ | $\dfrac{-G}{1+GH}$ | $\dfrac{-G}{1+GH}$ |

*FIG. 20*

| inject at | measure at | | | | |
|---|---|---|---|---|---|
| | y | u | c | x | e |
| $d_1$ | $\dfrac{y}{d_1-y}$ | $\dfrac{Hd_1}{u-1}$ | $\dfrac{Hd_1}{c-1}$ | $\dfrac{d_1}{x}-1$ | $\dfrac{-e}{d_1+e}$ |
| $d_2$ | $\dfrac{Hy}{d_2-Hy}$ | $\dfrac{d_2}{u}-1$ | $\dfrac{-c}{d_2+c}$ | $\dfrac{-Hx}{d_2+Hx}$ | $\dfrac{-He}{d_2+He}$ |

*FIG. 21*

REFERENCE VOLTAGE CHANGE IN A DIGITAL POWER SUPPLY

RELATED APPLICATIONS

This application claims the benefit of U.S. provisional application Ser. No. 60/939,013, filed May 18, 2007, which is hereby incorporated by reference in its entirety.

FIELD OF THE DISCLOSURE

This disclosure relates generally to control systems and, more particularly, to methods and apparatus to implement and/or control digital power supplies.

BACKGROUND

A power supply is a device that receives an input signal (i.e., a voltage source, a current source, a voltage rail, etc.), converts the input signal into an output signal (i.e., a voltage output, a current output, a voltage rail, etc.) having desired characteristics, and outputs the output signal. For example, a personal computer may include a power supply that receives a 120 volt alternating current signal and outputs a 12 volt direct current signal. One type of power supply uses a feedback control system that adjusts the power supply based on the output of the power supply to ensure that the output meets the desired characteristics. For example, if the desired output of the power supply is 12 volts and the power supply is currently outputting a signal that is 12.5 volts, the feedback control system may adjust the power supply to reduce the output to the desired 12 volts.

One example system for implementing a feedback control system is a digital control system. A digital control system is a control system in which digital circuitry (e.g., a digital signal processor) completes the feedback loop of the feedback control system. The digital circuitry receives one or more signals of the power supply (e.g., the output of the power supply) and controls the power supply to cause the power supply to output a signal having desired characteristics. The digital control system may receive control instructions from a workstation, such as a personal computer, that control the operation of the power supply. For example, the workstation may send control instructions that specify the desired characteristics of the output signal of the power supply.

BRIEF DESCRIPTION OF THE DRAWINGS

FIG. 20 is a table showing the transfer function gain for the injection locations and the measurement locations of the closed loop control system of FIG. 8.

FIG. 21 is a table showing the open loop transfer function for the injection locations and the measurement locations of the closed loop control system of FIG. 8.

DETAILED DESCRIPTION

Figure 1:
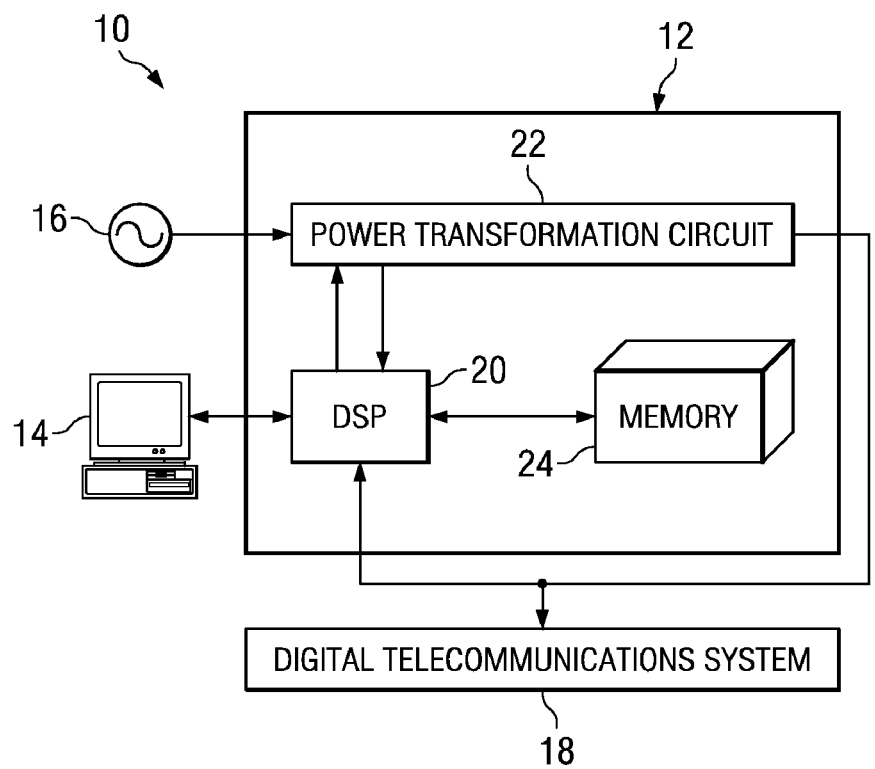
FIG. 1 is a block diagram of an example system including an example digital power supply as disclosed herein.

FIG. 1 is a block diagram of an example system 10 including an example digital power supply 12 as disclosed herein. The example system 10 includes the digital power supply 12, a workstation 14, a source 16, and a digital communication system 18. In the example system 10, the digital power supply 12 receives control information from and sends diagnostic information to the workstation 14. The workstation 14 enables a user/operator to configure (e.g., set operating conditions) and/or evaluate (e.g., evaluate one or more operating conditions) the operation of the digital power supply 12. The digital power supply 12 receives a signal (e.g., 120 Volts alternating current (AC)) from the source 16, transforms the signal into an output (e.g., a voltage and/or current signal) that is appropriate for the digital telecommunication system 18, and outputs the output to the digital telecommunication system 18.

The digital power supply 12 of the illustrated example includes a digital signal processor (DSP) 20, a power transformation circuit 22, and a memory 24.

The DSP 20 of the illustrated example receives outputs from the power transformation circuit 22, including the voltage output that is provided to the digital communication system 18. In response to the outputs, the DSP 20 sends control information to the power transformation circuit 22, which adjusts the operation of the power transformation circuit 22. For example, if the outputs of the power transformation circuit 22 indicate that the voltage output provided to the digital communication system 18 has a voltage that is below a desired voltage (e.g., a reference voltage), the DSP 20 will detect such a situation and will send control information to the power transformation circuit 22 to cause the power transformation circuit 22 to increase the voltage output.

In addition to the outputs from the example digital communication system 18, the DSP 20 receives control instructions from the workstation 14 to control the operation of the DSP 20. For example, the control instructions may modify the reference voltage that is the target for the output voltage of the power transformation circuit 22 thereby causing the DSP 20 to control the power transformation circuit 22 to achieve the new target voltage as its output. In another example, the control instructions may control how aggressively the DSP 20 controls the power transformation circuit 22 (e.g., the amount of feedback gain that is used to avoid overshoot and undershoot).

The DSP 20 of the illustrated example sends diagnostic and operational information to the workstation 14 for analysis. The diagnostic and operational information may be any information that is available to or produced by the DSP 20. For example, the DSP 20 may send one or more of the outputs from the power transformation circuit 22 received by the DSP 20, information stored in the memory 24 and retrieved by the DSP 20, coefficients of compensation control provided by the DSP 20, a gain and/or phase shift of the power transformation circuit 22 and/or the combination of the DSP 20 and the power transformation circuit 22, etc. As described in further detail herein, the workstation 14 processes the information received from the DSP 20 and provides the processed information to user interfaces so that a user can monitor and/or adjust the operation of the digital power supply 12.

The memory 24 of the illustrated example stores, among other information, diagnostic and control information used by the DSP 20 and the operating instructions (e.g., machine-readable instructions) of the DSP 20. For example, the DSP 20 may receive control instructions from the workstation 14, and may store the control instructions in the memory 24. In addition, the DSP 20 may receive the outputs of the power transformation circuit 22 and may store the outputs in the memory 24 for later analysis and/or transfer to the workstation 14.

The power transformation circuit 22 of the illustrated example receives control information from the DSP 20 and an input signal from the source 16. The power transformation circuit 22 transforms the input signal from the source 16 into a desired output signal for use by the digital telecommunications system 18. The DSP 20 controls the transformation performed by the power circuit 22. For example, the power transformation circuit 22 may receive an alternating current (AC) signal from the signal source 16 and may convert the AC signal to a direct current (DC) signal, may modify the voltage of the input signal, may modify the current of the input signal, etc. While the example power transformation circuit 22 is illustrated as providing a signal to the digital telecommunications system 18, the power transformation circuit 22 may alternatively be used to provide a signal to any type of system.

The workstation 14 of the illustrated example receives diagnostic and operational information from the DSP 20 and sends control instructions to the DSP 20. The example workstation 14 may include a user interface and may accept user inputs such that a user of the system 10 may monitor and may adjust the operation of the system 10. Any type of user interface device using any type of suitable user interface may implemented by the workstation 14 such as, for example, a personal computer, a terminal workstation, a portable computing device, an LED display, one or more user input controls (e.g., buttons, dials, etc.), etc.

The source 16 of the illustrated example provides an AC input signal to the power transformation circuit 22. For example, the source 16 may be a signal received from a standard power outlet (e.g., 120 VAC). Alternatively, the source 16 may be any source of an input signal such as, for example, the output of a generator, an output of a converter, an output of a battery, etc.

The digital telecommunications system 18 of the illustrated example is provided as an example of a system that may receive the output signal of the power transformation circuit 22 of the digital power supply 12. Accordingly, because the digital telecommunications system 18 is provided as an example, no further description of the digital telecommunications system 18 is provided. In alternative implementations, the digital telecommunications system 18 may be replaced with any device capable of receiving an output signal from the digital power supply 12.

For ease of explanation, the following description is divided into two sections: 1. Operation Diagrams and Flowcharts, and 2. Diagnostic and Analysis. However, the classification of a figure into a particular section is not intended to be limiting. For example, a figure that is described in Section 1 may include diagnostic and analytical capabilities and features.

1. Operation Diagrams and Flowcharts

This section describes block diagrams and flowcharts associated with the implementation and operation of a digital control system, such as the digital power supply 12 of FIG. 1. The following description and associated block diagrams and flowcharts illustrate an example implementation of the digital power supply 12.

Figure 2:
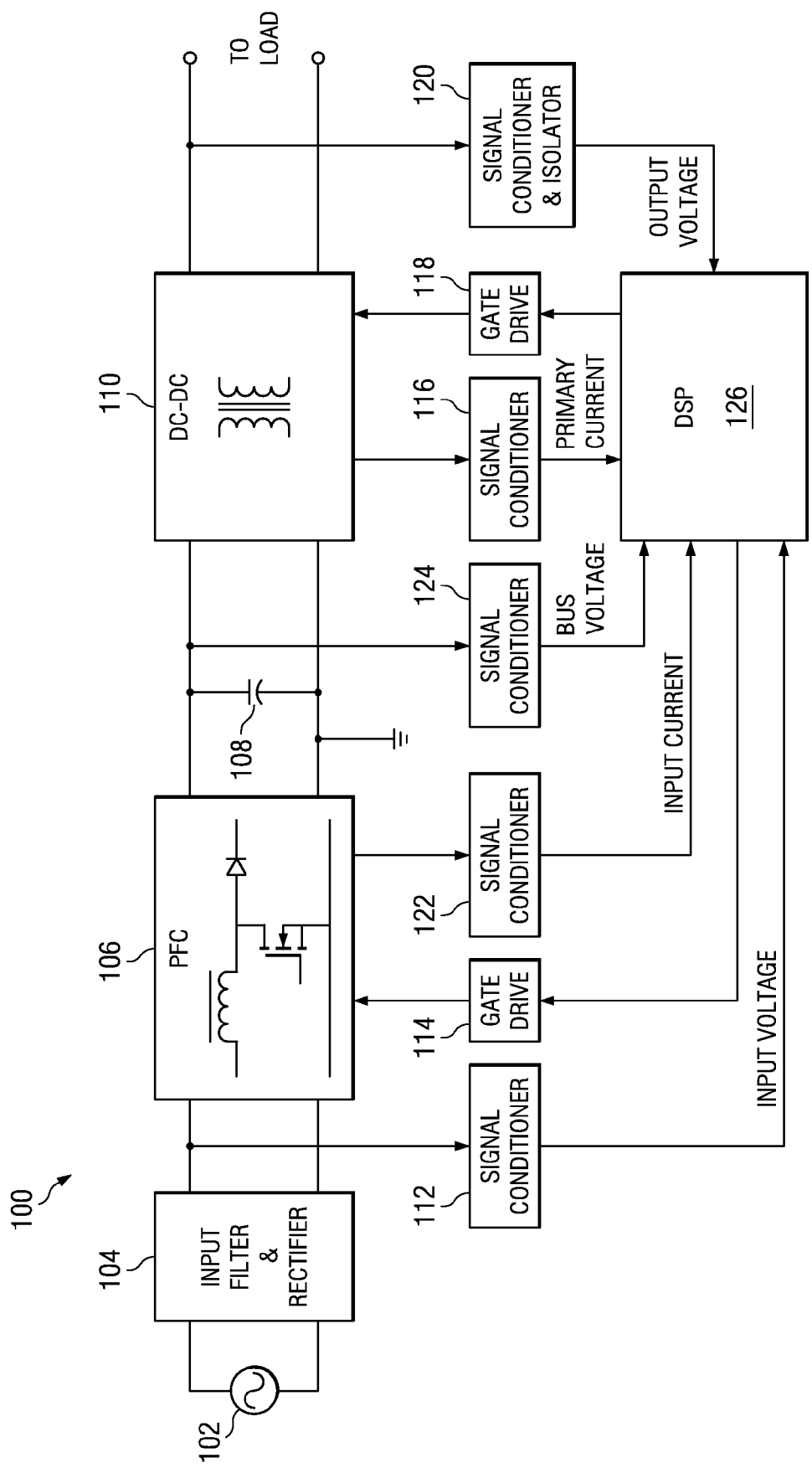
FIG. 2 is a block diagram of an example digital power supply.

FIG. 2 is a block diagram of an example digital power supply 100 that may implement the digital power supply 12 of FIG. 1. The example digital power supply 100 receives an input signal from a signal source 102 and outputs a modified version of the input signal to a load. For example, the digital power supply 100 may receive a 120 volt alternating current ($V_{AC}$) signal and may output a 48 volt (V) direct current (DC) signal. The digital power supply 100 of the illustrated example includes an input filter and rectifier 104, a power factor controller (PFC) 106, a capacitor 108, a DC-to-DC converter 110, a first signal conditioner unit 112, a first gate driver 114, a second signal conditioner unit 116, a second gate drive 118, a signal conditioner and isolation unit 120, third and fourth signal conditioner units 122 and 124, and a DSP 126.

The input filter and rectifier 104 removes high frequency noise (e.g., electromagnetic interference (EMI) noise) from the input signal received from the signal source 102 and converts the input signal from an AC signal to a rectified AC signal. The input filter and rectifier 104 and implementations thereof are described in further detail in conjunction with FIG. 3.

Figure 3:
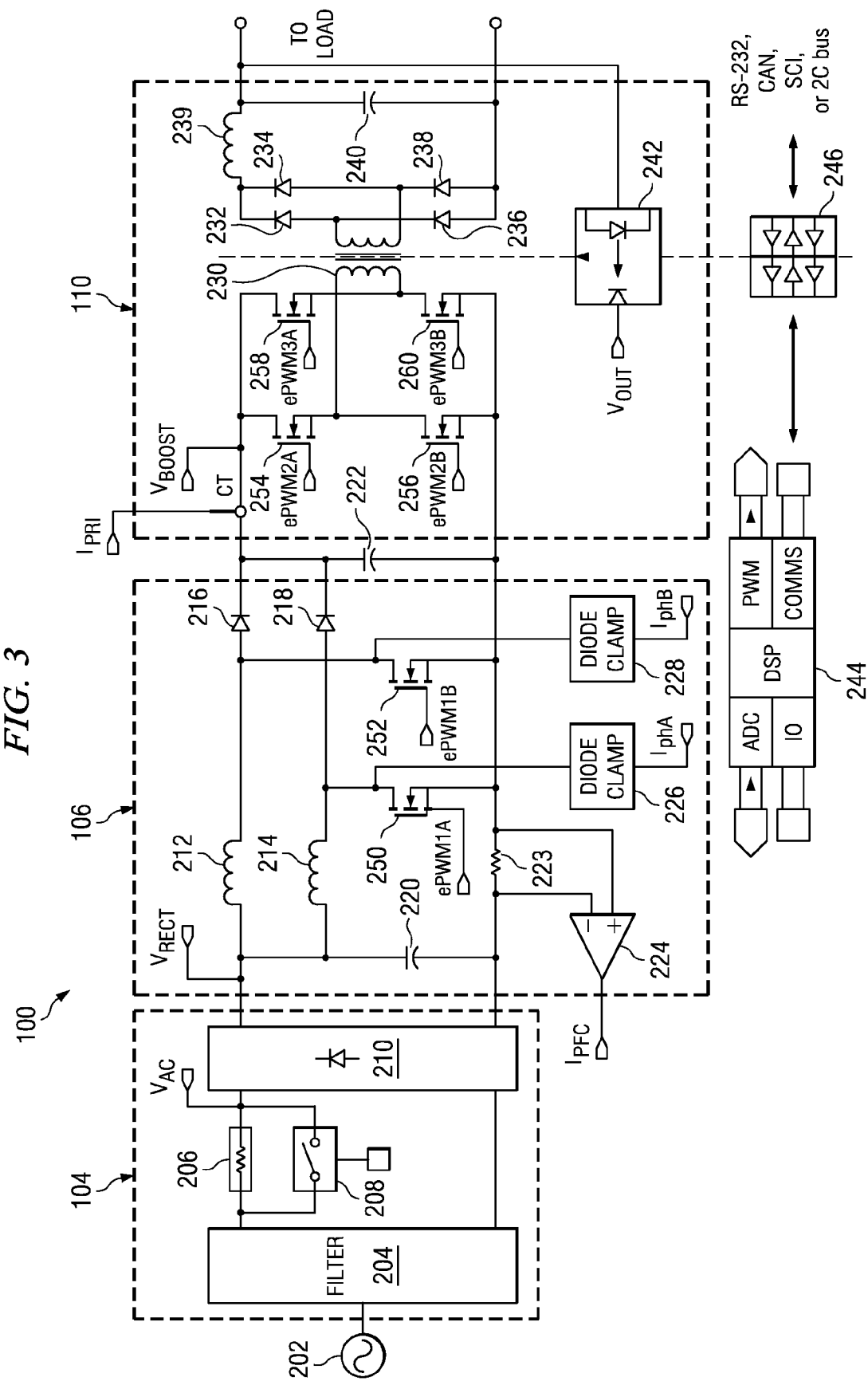
FIG. 3 is a schematic diagram of an example implementation of the digital power supply of FIG. 2.

The PFC 106 of the illustrated example provides two phase power factor correction (e.g., using a network of capacitors and inductors as described in conjunction with FIG. 3) for the example digital power supply 100 to reduce the amount of reactive power generated by the digital power supply 100. The PFC 106 of the illustrated example includes of two interleaved AC-DC boost converters. In an example implementation, the PFC 106 is driven by a single pulse width modulator (described in conjunction with FIG. 4) that counts up during a first half of its period and then counts down during the second half of its period. In the example implementation, a first phase of the PFC 106 is driven high when the count is above a first threshold and a second phase is driven high when the count is below a second threshold. Driving the PFC 106 in this manner causes the two phases of the PFC 106 to be 180 degrees out of phase. The PFC 106 is described in further detail in conjunction with FIGS. 2 and 4.

The capacitor 108 creates a low pass filter to remove to ground a high frequency portion of the signal output from the PFC 106.

The example DC-to-DC converter 110 receives the low pass filtered output of the PFC 106 and steps-down the same to a lower voltage signal. For example, the DC-to-DC converter 110 may convert a signal having a voltage of 385 volts to a signal having a voltage of 48 volts. An example implementation and the operation of the DC-to-DC converter is described below in conjunction with FIG. 3. The load of the digital power supply 100 is connected to the output of the DC-to-DC converter 110. For example, the output of the DC-to-DC converter 110 may be connected to the digital telecommunications device 18 that operates on a DC power signal. Further aspects related to the DC-to-DC converter 110 are described below in conjunction with FIGS. 3 and 5.

The example digital power supply 100 is controlled by the example DSP 126. In particular, the DSP 126 of the illustrated example receives signals from several points in the digital power supply 100 and outputs control signals based on the input signals to control the PFC 106 and the DC-to-DC converter 110 via the gate drive 114 and the gate drive 118, respectively, to achieve a desired output.

The signal conditioners 112, 116, 122, and 124, and the signal conditioner and isolator 120 modify their input signals to make them appropriate for sampling by the DSP 126. For example, the signal conditioners 112, 116, 122, and 124 and the signal conditioner and isolator 120 may amplify or attenuate the input signal, filter the input signal, etc.

The signal conditioner 112 receives a signal output by the input filter and rectifier 104. This signal is representative of the voltage of the input signal from the signal source 102. As described in further detail in conjunction with FIG. 3, the signal conditioner 112 may alternatively receive a signal intermediate to the input filter and rectifier 104. In another alternative, the digital power supply 100 may include another signal conditioner that is interposed between the DSP 126 and the intermediate point of the input filter and rectifier 104 that enables the DSP 126 to receive the intermediate signal and the signal at the output of the input filter and rectifier 104.

The signal conditioner 122 receives a signal from the PFC 106 that is representative of the current from the signal source 102. As described in further detail in conjunction with FIG. 3, additional signals from the PFC 106 may be conditioned and provided to the DSP 126. The signal from the signal conditioner 122 allows the DSP 126 to monitor the current of the PFC 106 to properly control the PFC 106.

The signal conditioner 124 receives a signal representative of the voltage of the output of the PFC 106.

The signal conditioner 116 receives a signal from the DC-to-DC converter 110 that is representative of the current flowing into the DC-to-DC converter 110.

The signal conditioner and isolator 120 receives the signal output by the DC-to-DC converter 110 that is also the output of the digital power supply 100. In addition to amplifying and/or filtering the signal, the signal conditioner and isolator 120 may include an optoisolator or other type of isolation circuitry to electrically isolate and prevent feedback between the output of the digital power supply 100 and the DSP 126. While in the description of the system of FIG. 2 the signal conditioner and isolator 120 is the only signal conditioner including an isolator, alternative implementations may include isolators in some or all of the signal conditioners 112, 116, 122, and/or 124 (e.g., any signal conditioner for any signal that crosses the DC-to-DC converter 110 may include isolation circuitry).

The DSP 126 of the illustrated example controls the operation of the digital power supply 100 through the use of the gate drive 114 and the gate drive 118. The gate drive 114 and the gate drive 118 control one or more gates of the PFC 106 and the DC-to-DC converter 110, respectively. The gate drive 114 and the gate drive 118 are described in further detail in conjunction with FIG. 3.

Returning to the DSP 126, the example DSP 126 receives the inputs from the signal conditioners 112, 116, 122, and 124, and the signal conditioner and isolator 120 and analyzes the signals to determine how to control properly the digital power supply 100 to provide a desired output. For example, the DSP 126 may adjust the compensation of the PFC 106 and the DC-to-DC converter 110 in response to input signals having various frequencies, voltages, and currents; in response to output loads having varied characteristics; in response to changing control states; etc. After analyzing the inputs, the DSP 126 controls the gate drive 114 and the gate drive 118 to adjust the output of the digital power supply 100.

FIG. 3 is a schematic diagram of an example implementation of the digital power supply 100 of FIG. 2. The example digital power supply 100 of FIG. 3 is fed by a signal source 202 and includes a filter 204, a resistor 206, a relay 208, a rectifier 210, an inductor 212, an inductor 214, a diode 216, a diode 218, a transistor 250, a transistor 252, a capacitor 222, a resistor 223, an operational amplifier 224, a diode clamp 226, a diode clamp 228, a transistor 254, a transistor 256, a transistor 258, a transistor 260, a converter 230, a diode 232, a diode 234, a diode 236, a diode 238, a capacitor 240, an optoisolator 242, a DSP 244, and a serial interface 246.

All of the transistors of the digital power supply 100 of the illustrated example may be implemented using metal oxide semiconductor field effect transistors (MOSFET). Alternatively, any type of transistor that can tolerate the voltage and/or current requirements of a particular implementation may be used.

The filter 204 of the illustrated example, like the filter portion of the input filter and rectifier 104 of FIG. 2, removes high frequency noise from the signal received from the signal source 202.

The resistor 206 and the relay 208 are configured to control inrush current when the input signal is initially received from the signal source 202. In the illustrated example, the relay is in an open state during initial startup (i.e., when the input signal is initially received). The resistor 206 limits the affect of the inrush current on the other components of the digital power supply 100. The DSP 244 monitors the input current via the $I_{PFC}$ connection and the bus voltage via the $V_{BOOST}$ connection to determine when the inrush current has settled. After the inrush current has settled, the DSP 244 closes the relay 208 to bypass the resistor 206 for normal operation. The output of the resistor 206 and/or the relay 208 is input to DSP 244 and is labeled $V_{AC}$ (as illustrated by the input connector). Alternatively, the DSP 244 may automatically close the relay 208 when the DSP 244 is turned on. For example, if the time required for the DSP 244 to activate is long enough that inrush current can be assumed to have settled, the DSP 244 can automatically close the relay whenever it is activated.

The rectifier 210 rectifies the input signal. The example rectifier 210 of the illustrated example is a full wave rectifier. However, any type of rectifier suitable for a desired implementation may be used. The capacitor 220 of the illustrated example smoothes the output of the rectifier 210.

The inductor 214, the diode 218, and the transistor 250 implement a first phase of a PFC similar to the PFC 106 of FIG. 2. The inductor 212, the diode 216, and the transistor 252 implement a second phase of the PFC similar to the PFC 106 of FIG. 2. Using two phases for the PFC 106 causes the ripple current of the inductor 212 and the ripple current of the inductor 214 to cancel each other out. The output current of the two phases of the PFC 106 is the sum of the current in the diode 216 and the diode 218, which is supplied to the capacitor 222. The DSP 244 of the illustrated example is configured to operate the two phases of the PFC 106 so that they are 180 degrees out of phase. As described in further detail in conjunction with FIG. 4, the transistor 250 is biased on when the transistor 252 is biased off, and vice versa.

The transistors 254, 256, 258 and 260 allow the DSP 244 to modulate the phase between the signal supplied to the converter 230 in response to a change in the load of the digital power supply 100, as measured by the output voltage measured at label $V_{OUT}$.

The converter 230 receives the signals from the transistors 254, 256, 258 and 260 and steps down the voltage. For example, the converter 230 may step down the voltage from 385 volts to 48 volts. In the example implementation of FIG. 3, the transistors 254, 256, 258 and 260 are used to convert the DC signal received from the PFC 106 into an AC signal. The example converter 230 has a differential winding to cause the high voltage input to be stepped down to a low voltage signal.

The AC signal having the stepped-down voltage at the output of the converter 230 is fed to an output rectifier implemented by diode 232, diode 234, diode 236, and diode 238, which collectively convert the AC signal from the converter 230 secondary to a DC signal. The rectified signal is then low pass filtered by the inductor 239 and the capacitor 240 before being output to the load attached to the digital power supply 100.

The DSP 244 of the illustrated example receives the output voltage $V_{OUT}$ as feedback via the optoisolator 242. The optoisolator 242 electrically isolates the DSP 244 from the output of the digital power supply 100. By monitoring the output voltage $V_{OUT}$, the DSP 244 can control the digital power supply 100 to provide a desired output voltage having desired characteristics. For example, the DSP 244 can compare the output voltage to a reference voltage. If the DSP 244 determines that the output voltage is lower than the reference voltage, the DSP 244 can send control information (e.g., the signals ePWM2A, ePWM2B, ePWM3A, and ePWM3B) to the DC-to-DC converter 110 to cause an increase in the output voltage.

The DSP 244 of the illustrated example receives multiple inputs from various points throughout the digital power supply 100. The inputs include voltage readings from $V_{AC}$, $V_{RECT}$, $V_{BOOST}$, and $V_{OUT}$ and current readings from $I_{PFC}$, $I_{phA}$, $I_{phB}$, and $I_{PRI}$. The $I_{PFC}$ signal is obtained by measuring the voltage across the resistor 223, which acts as a sense resistor, using the operational amplifier 224. The $I_{phA}$ and $I_{phB}$ signals represent the current flowing into the transistor 250 and the transistor 252, respectively. The $I_{phA}$ and $I_{phB}$ signals may be calculated by dividing the voltage measured by Rds on the associated transistor while the transistor is conducting. The $I_{phA}$ and $I_{phB}$ signals pass through the diode clamp 226 and the diode clamp 228, respectively. The $I_{PRI}$ signal is representative of the current flowing from the PFC 106 to the DC-to-DC converter 110 of the digital power supply 100.

Based on the input signals, the DSP 244 controls the components of the PFC 106 (e.g., transistor 250 and transistor 252) and the components of the DC-to-DC converter 110 (e.g., transistor 254, transistor 256, transistor 258, and transistor 260). The control of the PFC 106 is described in further detail in conjunction with FIG. 4. The control of the DC-to-DC converter 110 is described in further detail in conjunction with FIG. 5.

The serial interface 246 of the illustrated example provides a communications interface to the DSP 244. For example, a serial port of a personal computer may be attached to the serial interface 246, may send instructions to the DSP 244, and may receive information about the DSP 244 via the serial interface 246. The serial interface 246 may be any type of communication interface such as, for example, a universal serial bus interface, a parallel communication interface, a recommended standard 232 (RS-232) interface, a serial communication interface (SCI), an inter-integrated circuit ($I^2C$) interface, etc.

A. PFC Control

Figure 4:
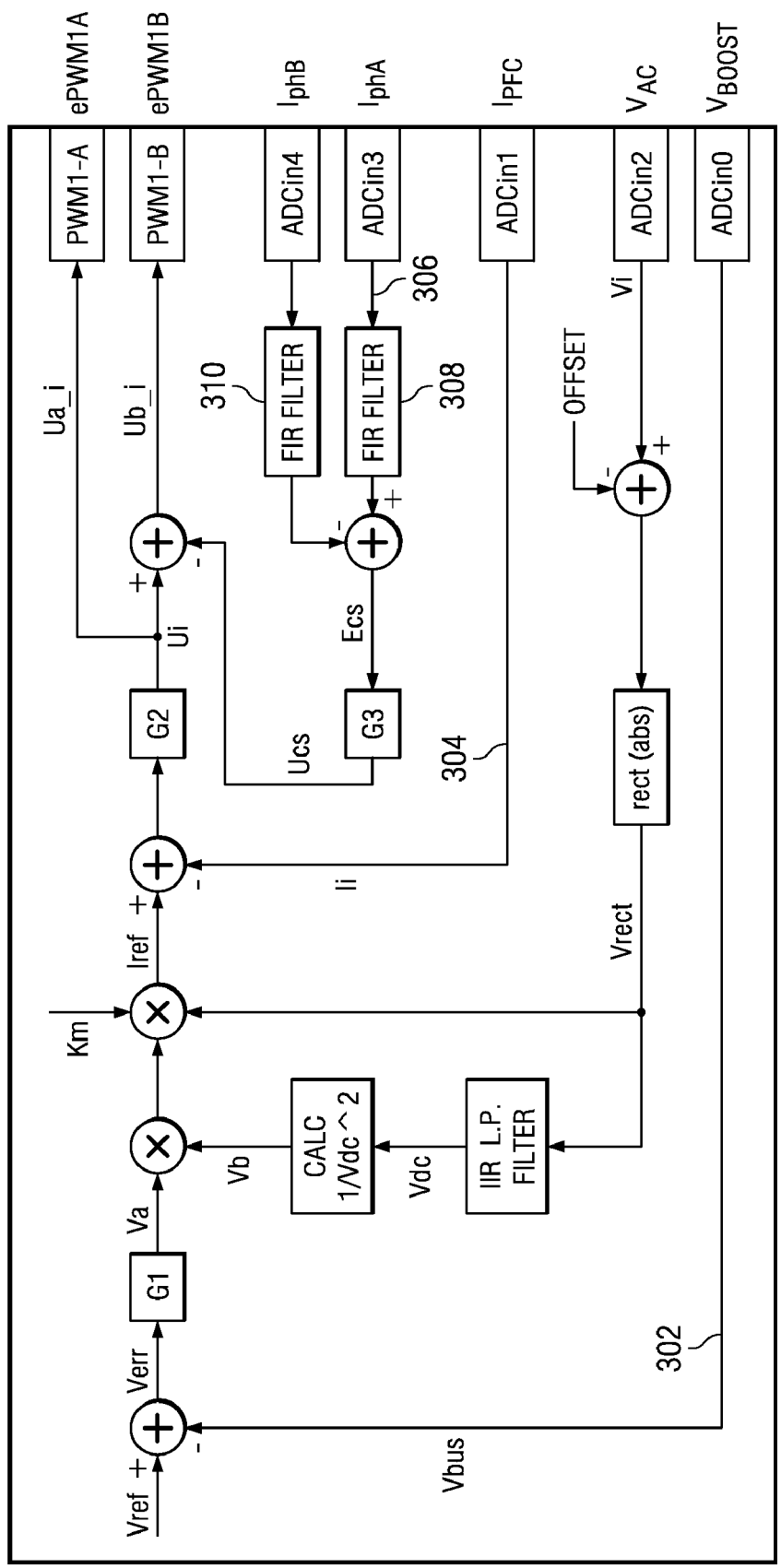
FIG. 4 is a block diagram of example processes that may be implemented by the digital signal processor (DSP) of FIG. 2 and/or FIG. 3 to control the two phases of the power factor controller (PFC) of FIGS. 2 and/or 3.

FIG. 4 is a block diagram of functionality that may be implemented by the DSP 126 of FIG. 2 and/or the DSP 244 of FIG. 3 to control the two phases of the PFC 106 of FIGS. 2 and/or 3. The example functionality includes three feedback loops 302, 304, 306. The average output DC voltage is regulated by an outer voltage loop 302, which has a slow response. An inner current loop 304 which has a fast response shapes the current to match the input voltage waveform, thereby maintaining a high power factor at the mains input. In addition to these two loops, a third current share loop 306 helps to maintain equal current through the transistors 250 and 252.

To develop controlled PWM gate drive signals (PWM1A and PWM1B), the example functionality of FIG. 4 first compares the digitized bus voltage $V_{BOOST}$ to a desired reference bus voltage Vref. The bus voltage Vref is received from a reference voltage source (not shown) or determined from a system parameter. The difference signal Verr is then fed into a voltage loop compensator G1. The example voltage loop compensator G1 includes a two-pole, two-zero difference equation and is implemented as an assembly language macro on the DSP 244. The digitized output of the voltage loop compensator G1, labeled Va in FIG. 4, is multiplied by Vrect ($V_{AC}$ after a DC offset is subtracted and the signal is rectified by the rect(abs) block), Vb (Vrect after Infinite Impulse Response (IIR) low pass filtering to get the average input voltage, squaring, and inverting to apply feedforward compensation), and multiplier gain, Km, to generate the reference current command, Iref, for the inner current loop. Feedforward compensation is required because, for a given fixed load, it is desired to have the PFC provide constant power regardless of the input RMS voltage. Multiplier gain, Km, is adjusted such that at the minimum input voltage, reference current, Iref, is at its maximum when the PFC converter delivers the maximum load. In the illustrated example, the reference current command, Iref, has the shape of a rectified sinewave and its amplitude is such that it maintains the output DC voltage at a reference level, Vref, regardless of variation in load and fluctuation in line voltage.

In the example functionality shown in FIG. 4, the reference current command, Iref, is compared to the input signal, $I_{PFC}$. The difference between the reference current command, Iref, and the input signal, $I_{PFC}$, is fed into regulator G2 to generate the unadjusted PWM duty ratio command for the PFC switches. The output of the regulator G2 is signal PWM1A, which is output to control the transistor 250.

To develop the control signal for transistor 252, the current through the transistor 252, $I_{phB}$, is filtered by a finite impulse response (FIR) filter 308 and is subtracted from the output of a FIR filter 310 fed by current though the transistor 250 $I_{phA}$ to create the current error signal Ecs. The current error signal Ecs is then fed to the current share controller G3. The output of the current share controller G3 is then added to the output of the regulator G2 to generate the signal PWM1B, which is output to control the transistor 252.

While the example implementation of FIG. 4 indicates that the output of integrator G3 is added to only one phase of the control system control signals, the output of the integrator may alternatively be added to one phase and subtracted from another (e.g., the output of the current share controller G3 may be added to the gate drive signal PWM1B and subtracted from the gate drive signal PWM1A).

Further, while the implementation of FIG. 4 is configured for a two phase control system (e.g., phase A and phase B of the control system 100 of FIG. 3), the implementation of FIG. 4 may be modified to support a control system having any number of phases. For example, an average of the current in all phases can be computed and the difference between the current in each phase and the average current can be integrated and used to adjust each phase's control signal.

B. DC-to-DC Converter Control

Figure 5:
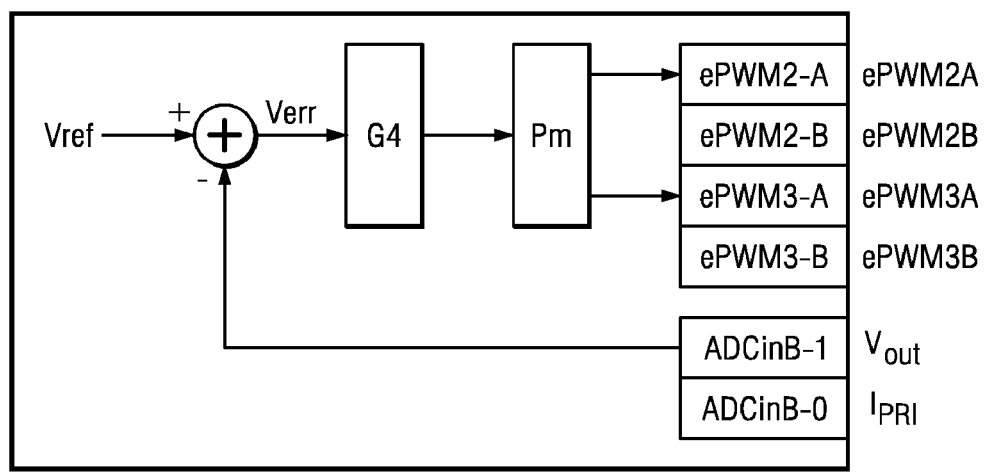
FIG. 5 is a block diagram of example processes that may be implemented by the DSP of FIG. 2 and/or the DSP of FIG. 3 to control the direct current (DC) to DC converter of FIGS. 2 and/or 3.

FIG. 5 is a block diagram of functionality that may be implemented by the DSP 126 of FIG. 2 and/or the DSP 244 of FIG. 3 to control the DC to DC converter 110 of FIGS. 2 and/or 3. In the example functionality, the output voltage $V_{out}$ of the digital power supply 100 is compared to the reference voltage Vref. The difference signal Verr is then fed to voltage loop controller G4. The output of the voltage loop controller G4 is then fed to the phase shift modulator, Pm. The phase shift modulator, Pm, translates the output of the voltage loop controller G4 into the phase-shift command information needed by hardware PWM components that control the transistors 254, 256, 258 and 260.

C. PWM Signals

Figure 6:
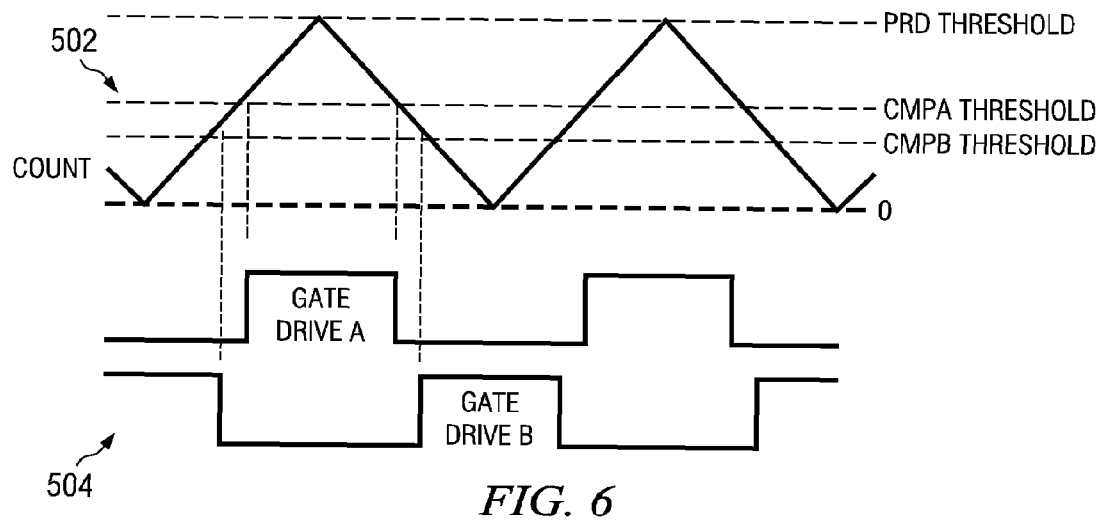
FIG. 6 is a waveform plot of an example timebase counter of the pulse width the modulator 3 of FIGS. 4 and/or 5.

FIG. 6 is a graph of an example timebase counter of pulse width modulator PWM1 (i.e., PWM1A and PWM1B of FIG. 4). The counter operates in an up/down manner to, in one example, generate a symmetrical triangle wave. As shown by gate drive control plots 504, gate drive A (e.g., PWM1A) is activated when the count 502 rises through a comparator A (CMPA) threshold and gate drive A is deactivated when the count 502 falls through a CMPA threshold. Gate drive B (e.g., PWM1B) is activated when the count 502 falls through a comparator B (CMPB) threshold and gate drive B is deactivated when the count 502 rises through the CMPB threshold. Accordingly, the gates are guaranteed to be driven 180 degrees out of phase.

The CMPA and CMPB thresholds are established based on the required duty cycle (i.e., power stage control effort) of the PFC 106 of FIG. 2 and/or FIG. 3. The required compensation duty cycle may be calculated by the DSP 126 and/or DSP 244. The threshold CMPA is set to a value that is equal to the maximum value of the counter minus one half of the required duty cycle (e.g., a threshold of 90% of the maximum value of the counter would result in a duty cycle of 20%). The threshold CMPB is set to a value that is equal to one half of the duty cycle (e.g., 10% of the maximum value of the counter for a duty cycle of 20%). Setting the thresholds in this manner causes the signals PWM1A and PWM1B to be centered on the high and the low peaks of the counter values respectively. Accordingly, the signals will be exactly 180 degrees out of phase with each other and the pulse widths for the two phases will be the same.

Generating the PWM1A and PWM1B signals using CMPA and CMPB may cause the pulses of the PWM1A and PWM1B signals to be centered on a fixed point in the period of the PWM1A and PWM1B signals, respectively. The triangle wave of the counter (i.e., an up/down counter) results in pulse width modulation occurring on both the leading edges and trailing edges of the pulses and causes the time between leading edges and falling edges to remain constant. Generating the PWM1A and PWM1B signals in this manner minimizes the harmonics of the PWM1A and PWM1B signals output by the pulse width modulator PWM1 because the harmonics of the outputs of the pulse width modulator PWM1 are affected by the timing between the centers of the pulses.

Figure 7:
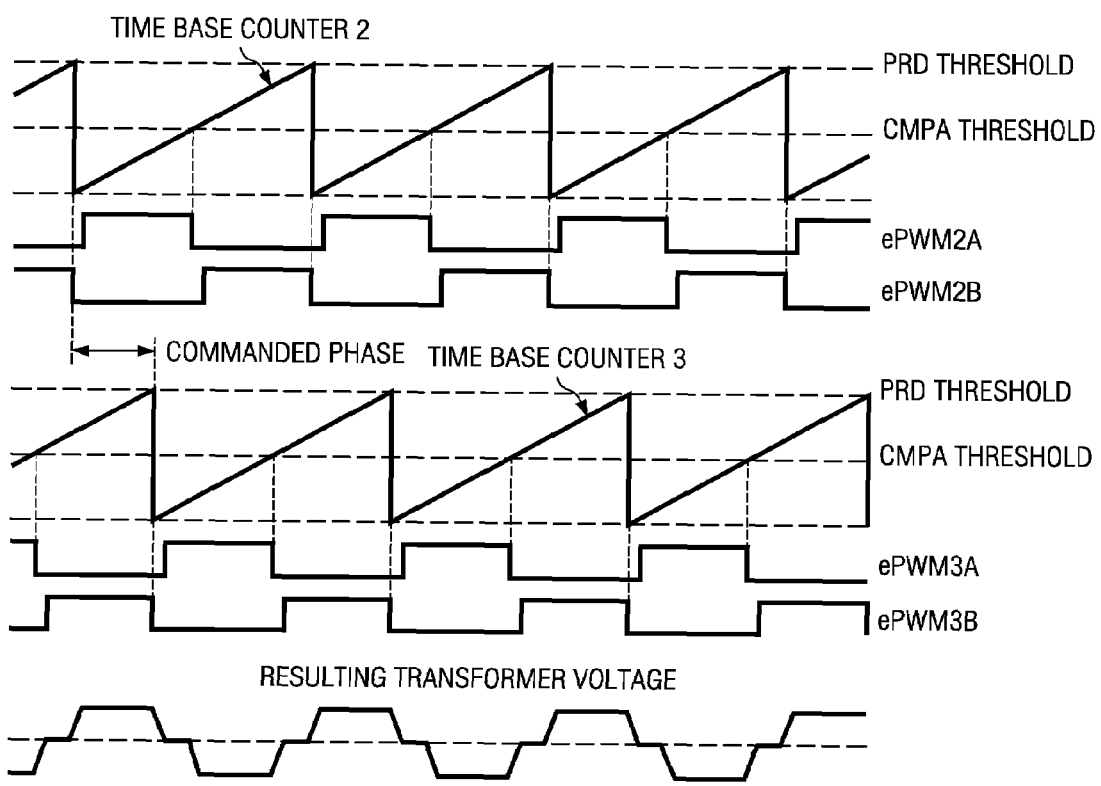
FIG. 7 is a waveform plot of two example timebase counters of the pulse width modulator 3 of FIGS. 4 and 5.

FIG. 7 is a graph of two timebase counters (timebase 2 and timebase 3) of the pulse width modulators PWM2 (i.e., generating signals ePWM2A and signal ePWM2B of FIG. 5) and PWM3 (i.e., generating signal ePWM3A and signal ePWM3B of FIG. 5) of the functionality of FIG. 5. Unlike the counters in FIG. 6, the counters of FIG. 7 operate based on ramp signals (i.e., count from zero to their maximum value and then restart counting at zero). The transistor 254 is activated by PWM2A when the count of timebase 2 is zero and is deactivated when the count rises through the CMPA threshold. The ePWM2B signal is a shifted version of the ePWM2A signal. The signal is shifted by a deadband timing unit based on the load applied to the digital power supply 100. The transistor 258 is activated by the ePWM3A signal when the count of timebase 3 is zero and is deactivated when the count rises through the CMPA threshold. The PWM3B signal is a shifted version of the PWM3A signal. The signal is shifted by the deadband timing unit based on the load applied to the digital power supply 100. The phase difference between PWM2 (e.g., signal ePWM2A and signal ePWM2B) and PWM3 (e.g., signal ePWM3A and signal ePWM3B) controls the amount of power delivered to the bridge 230 of the DC-to-DC converter 110.

D. Closed Loop Control

Figure 8:
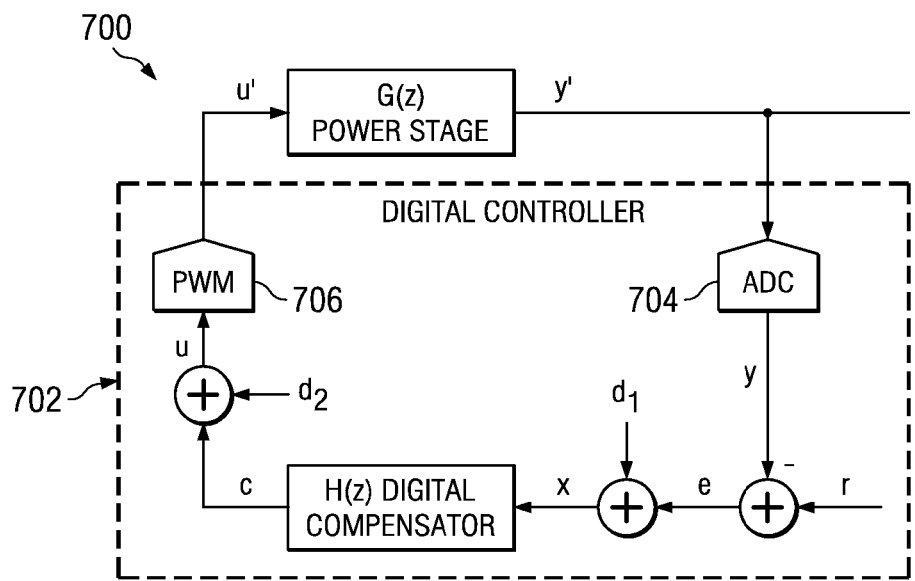
FIG. 8 is a block diagram of an example closed loop control system for controlling the power stage of the digital power supply of FIG. 2 and/or FIG. 3.

FIG. 8 is a block diagram of an example closed loop control system 700 for controlling the components of the digital power supply 100 of FIG. 2 and/or FIG. 3. The example control system 700 includes a digital controller 702 and a power stage G(z). In the illustrated example, the digital controller 702 samples the output of the power stage G(z) y' and outputs a control signal u' that controls the operation of the power stage G(z).

The example power stage G(z) represents functionality that may be implemented by PFC 106, DC-to-DC converter 110, or any other control element that receives a control signal and generates an output signal.

The digital controller 702 includes an analog to digital converter (ADC) 704, a digital compensator H(z) and a pulse width modulator (PWM) 706. The ADC 704 receives the output of the power stage G(z) y' and converts the signal from an analog signal to a digital signal by periodically sampling the input signal. For example, the ADC 704 may sample the input signal once every 10 microseconds (i.e., a frequency of 100 kHz). The converted digital signal is labeled y.

The converted digital signal y is subtracted from a reference signal r to create the error signal e. For example, if converted signal y represents a voltage signal and reference signal r represents a reference voltage, error signal e will be the voltage difference between the converted signal y and the reference signal r. Error signal e is added to input signal d1 to generate signal x. Input signal d1 may be any input signal that is injected into the error signal e. The input signal d1 is described in further detail below.

Signal x is input to the digital compensator H(z). The digital compensator H(z) generates a control signal c based on the signal x. For example, the digital compensator H(z) may be any type of digital controller. In the illustrated example, the digital compensator H(z) is programmed to generate a control signal that is predicted to eventually eliminate the error between the converted signal y and the reference signal r (represented by the error signal e).

The control signal c is added to the input signal d2 to generate the control signal u. Input signal d2 may be any input signal that is injected into the control signal c. The input signal d2 is described in further detail below. The control signal u is input to the PWM 706. The PWM 706 pulse width modulates the control signal u to generate the control signal u'. As previously described, the control signal u' is input to the power stage G(z) to control the operation of the power stage G(z).

The closed loop control system 700 may be analyzed to determine a transfer function for various parts of the system. An example process for determining a transfer function is described in conjunction with FIG. 15. The open loop transfer function that is used in the process of FIG. 15 may be calculated by first determining the basic system equations. For the example system of FIG. 8, the basic equations for the closed loop control system 700 are:

$$y = Gu$$

$$u = c + d_2$$

$$c = Hx$$

$$x = e + d_1$$

$$e = r - y \quad (1)$$

Solving for y yields:

$$y = \frac{GH}{1+GH}r + \frac{GH}{1+GH}d_1 + \frac{G}{1+GH}d_2 \quad (2)$$

Solving for u yields:

$$u = \frac{H}{1+GH}r + \frac{H}{1+GH}d_1 + \frac{1}{1+GH}d_2 \quad (3)$$

Solving for c yields:

$$c = \frac{H}{1+GH}r + \frac{H}{1+GH}d_1 - \frac{GH}{1+GH}d_2 \quad (4)$$

Solving for x yields:

$$x = \frac{1}{1+GH}r + \frac{H}{1+GH}d_1 - \frac{G}{1+GH}d_2 \quad (5)$$

Solving for e yields:

$$e = \frac{1}{1+GH}r - \frac{GH}{1+GH}d_1 - \frac{G}{1+GH}d_2 \quad (6)$$

Accordingly, the there are four possible transfer gains for the closed loop control system 700:

$$\frac{GH}{1+GH}, \frac{G}{1+GH}, \frac{H}{1+GH}, \text{ and } \frac{1}{1+GH} \quad (7)$$

The applicable transfer gain depends on the location at which the input signal (e.g., input signal d1 or input signal d2) is injected and the location at which the response signal is measured.

The open loop transfer function is G(f)H(f) where G(f) is the frequency response of the power stage G(z) and H(f) is the frequency response of the digital compensator H(z).

The equation for the open loop gain includes H(f) when the injected input signal is input on one side of the digital compensator H(z) and the response signal is measured on the other side of the digital compensator H(z). Such a combination of injection and response measurement adds computational complexity, but can be handled using the following equation:

$$z = \exp(j2\pi f_{meas} T_s) \quad (8)$$

$$z = \cos(2\pi f_{meas} T_s) + j\sin(2\pi f_{meas} T_s)$$

$$H(f_{meas}) = \frac{b_0 z^2 + b_1 z + b_2}{z^2 + a_1 z + a_2}$$

FIG. 20 is a table showing the transfer gains for the injection locations and the measurement locations of the closed loop control system 700. FIG. 21 is a table showing the open loop transfer function G(f)H(f) for the injection locations and the measurement locations of the closed loop control system 700.

When injecting the input signal of a predetermined frequency into the closed loop control system 700, it may be desirable to choose an injection point and measurement point combination that has desirable response characteristics at the predetermined frequency. For example, a response may have a very small magnitude at low frequency and a high magnitude at high frequency. Accordingly, it would be desirable to use a combination with a high magnitude at low frequency when injecting a low frequency signal.

Figure 22:
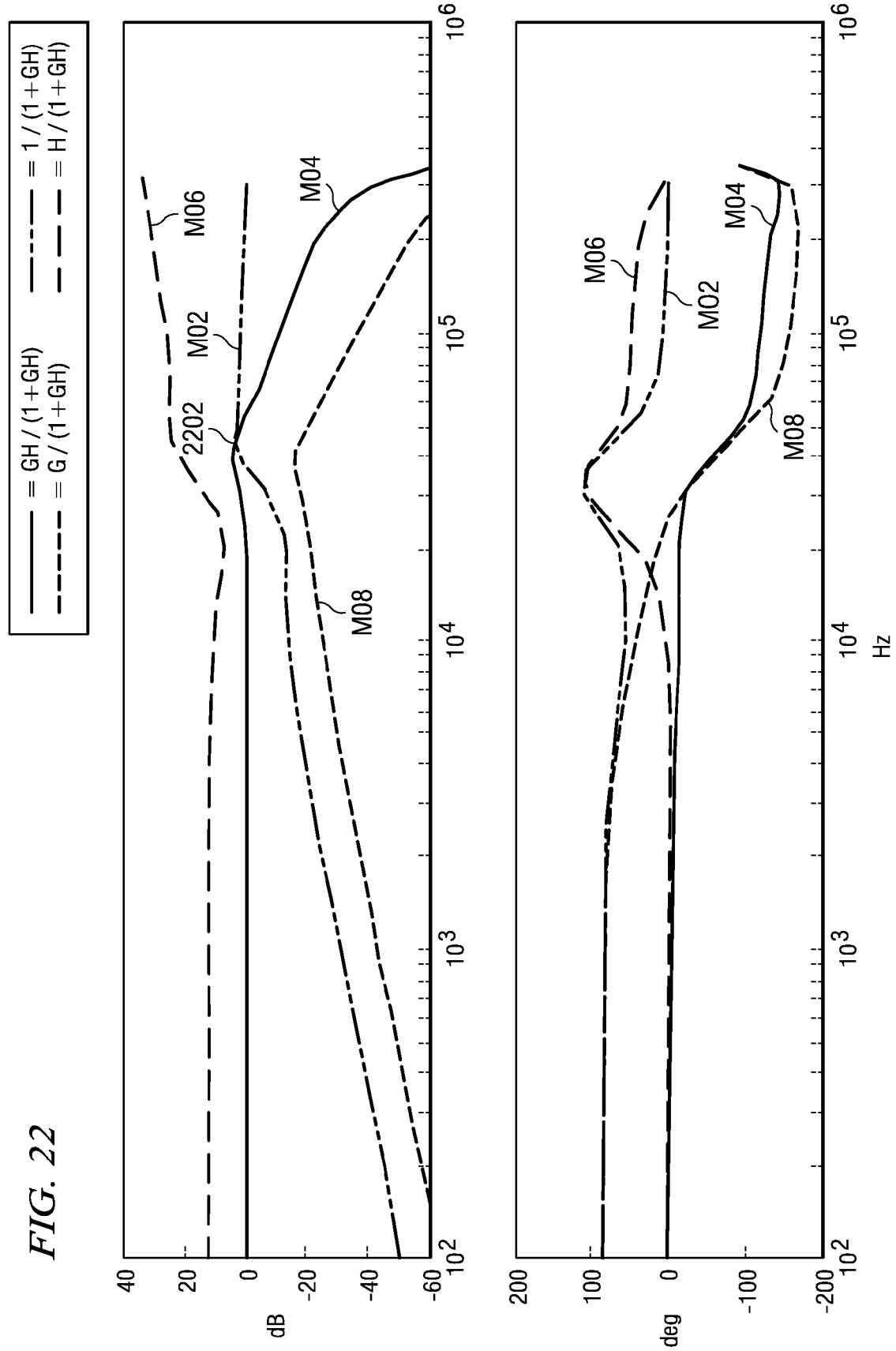
FIG. 22 is a bode plot showing the open loop magnitude and phase responses for the four possible transfer function gains of FIG. 20.

FIG. 22 is a bode plot showing the open loop magnitude and phase responses for the four possible transfer gains referenced in equation 7. The response for gain $$\frac{GH}{1+GH}$$

is labeled M04, the response for gain $$\frac{G}{1+GH}$$

is labeled M08, the response for gain $$\frac{H}{1+GH}$$

is labeled M06, and the response for gain $$\frac{1}{1+GH}$$

is labeled M02. As shown in FIG. M, response M02 and response M08 have low magnitude responses at low frequencies and response M04 and response M08 have low magnitude responses at high frequencies. Response M06 has a response greater than zero at both low and high frequencies.

E. Control Processes

FIGS. 9-15 illustrate flowcharts representative of example processes that may be executed to implement the digital power supply 100 illustrated in FIGS. 2 and 3. The example processes of FIGS. 9-15 may be implemented using machine-readable instructions executed by a processor, a controller, and/or any other suitable processing device. For example, the example processes of FIGS. 9-15 may be embodied in coded instructions stored on a tangible medium such as a flash memory, or RAM associated with a processor (e.g., a DSP). Alternatively, some or all of the example processes shown in the flowcharts of FIGS. 9-15 may be implemented using an application specific integrated circuit (ASIC), a programmable logic device (PLD), a field programmable logic device (FPLD), discrete logic, hardware, firmware, etc. Also, some or all of the example processes of FIGS. 9-15 may be implemented manually or as combinations of any of the foregoing techniques, for example, a combination of firmware and/or software and hardware. Further, although the example processes of FIGS. 9-15 are described with reference to the flowcharts of FIGS. 9-15, persons of ordinary skill in the art will readily appreciate that many other methods of implementing the example digital power supply 100 illustrated in FIGS. 9-15 may be employed. For example, the order of execution of the blocks may be changed, and/or some of the blocks described may be changed, eliminated, sub-divided, or combined. Additionally, persons of ordinary skill in the art will appreciate that the example processes of FIGS. 9-15 be carried out sequentially and/or carried out in parallel by, for example, separate processing threads, processors, devices, circuits, etc.

Figure 9:
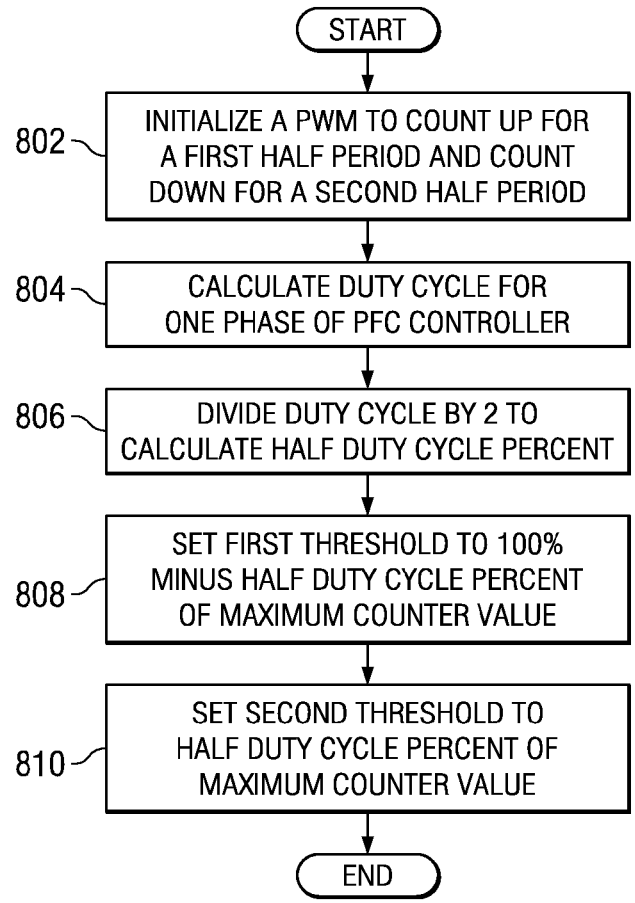
FIG. 9 is a flowchart illustrating an example process for controlling a power stage.

FIG. 9 is a flowchart illustrating an example process for controlling a power stage (e.g., the PFC 106 of FIG. 2 or 3). The example process of FIG. 9 begins when a digital signal processor (e.g., the DSP 126 of FIG. 2 or the DSP 244 of FIG. 3) initializes a pulse width modulator (e.g., pulse width modulator PWM1) to count up for a first half of its period and count down for a second half of its period (e.g., to count as a triangle wave) (block 802). The digital signal processor then calculates a required duty cycle for the first phase of a power factor controller (e.g., the PFC 106 of FIG. 2 or FIG. 3) (block 804). The required duty cycle is divided in half to determine a half duty cycle (block 806). Then, the digital signal processor sets a first threshold (e.g., threshold CMPA) to be 100% minus the half duty cycle percent of the maximum value of the pulse width modulator (block 808). The digital signal processor sets a second threshold (e.g., threshold CMPB) to the half duty cycle percent of the maximum value of the pulse width modulator (block 810). For example, if the required duty cycle is calculated to be 20%, the first threshold would be set to 90% of the maximum value of the pulse width modulator and the second threshold would be set to 10% of the maximum value of the pulse width modulator.

F. Integrator Control

Figure 10:
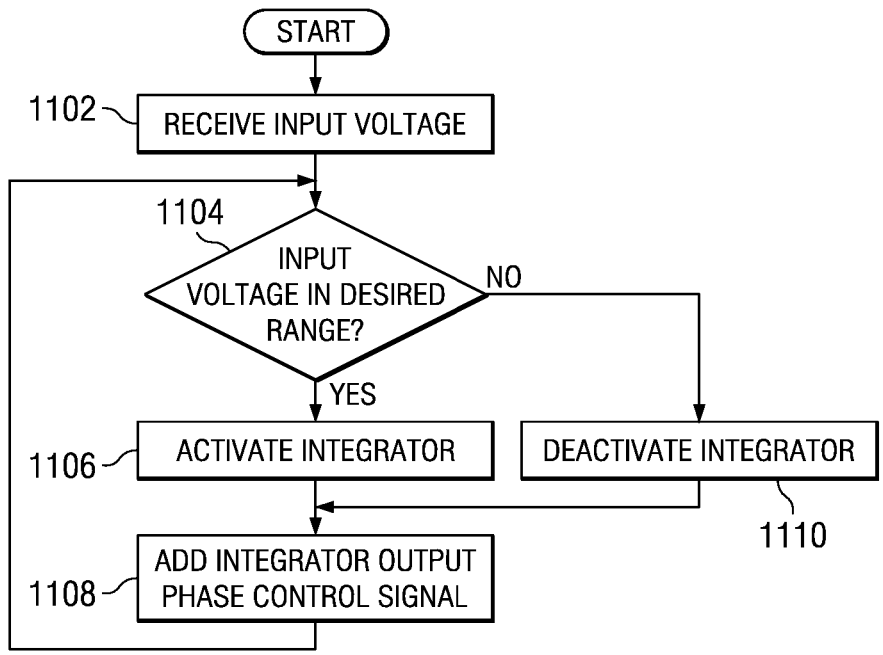
FIG. 10 is a flowchart illustrating an example process for controlling integration in a control system.

FIG. 10 is a flowchart illustrating an example process for controlling integration in a control system (e.g., the firmware illustrated in FIG. 4). The current integration loop illustrated in FIG. 4 comprises the current input $I_{phA}$, the current input $I_{phB}$, the FIR filter 308, the FIR filter 310, and the current share controller G3 of FIG. 4. When a control system is operating, most current draw occurs when the input signal is near the peaks of the AC voltage (e.g., a positive voltage peak and a negative voltage peak).

Figure 16:
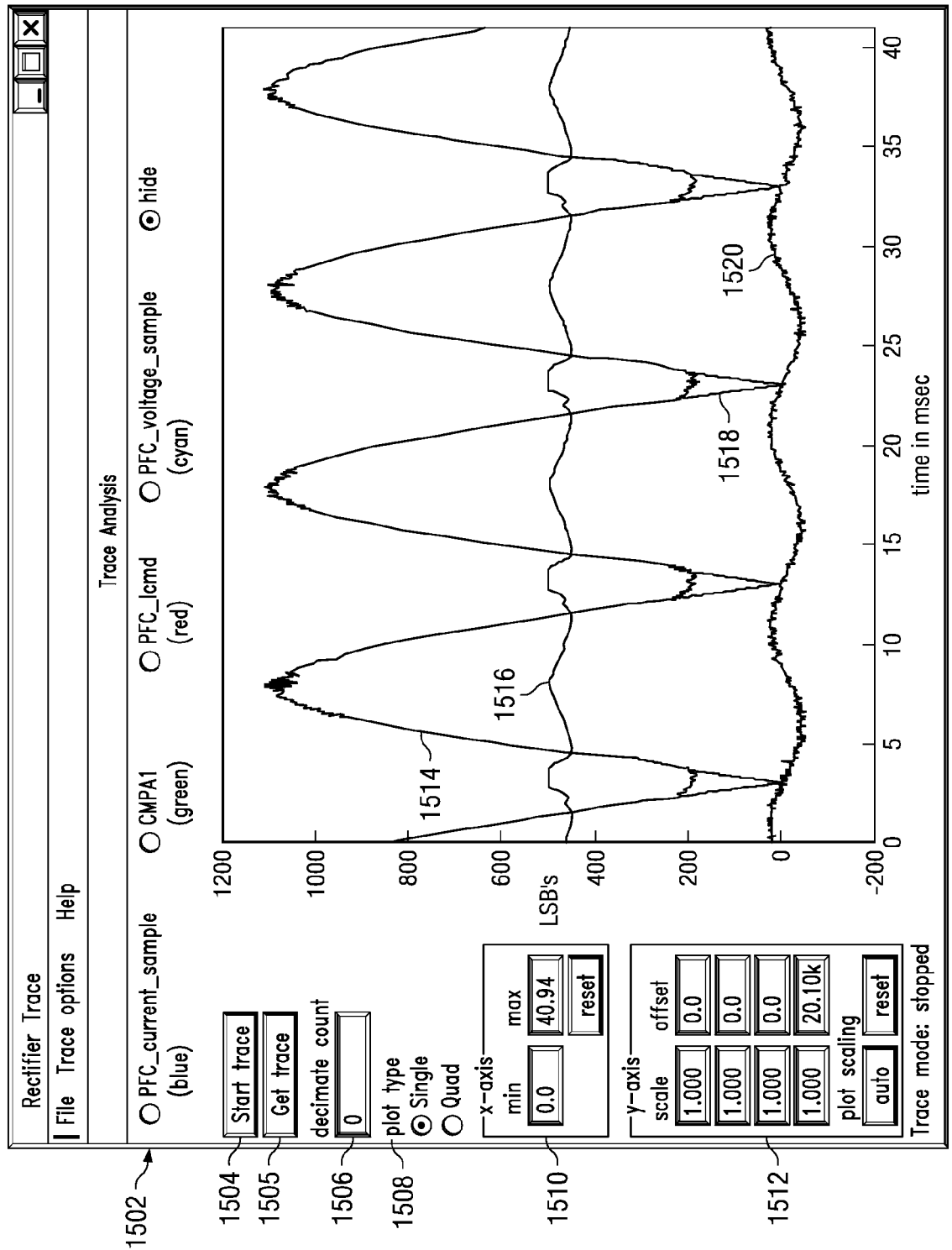
FIG. 16 is an illustration of an example graphical user interface displaying diagnostic and operational parameters that may be provided to users of a digital control system.

For example, FIG. 16 illustrates an example plot of PFC current 1514 and reference current 1518. As shown in the example, the PFC current 1514 matches very closely to the reference current 1518 and high amplitudes. However, at low amplitudes the PFC current 1514 and the reference current 1518 do not match.

In the example process illustrated in FIG. 10, an integrator (e.g., the current share controller G3) is operated only when the input voltage (e.g., input voltage VAC) is outside of a predetermined threshold. For example, the integrator may only run when the input AC voltage is greater than 5 volts or less than −5 volts. In an alternative implementation, the difference between the currents of each phase of the controller (e.g., the difference between IphB and IphA) may be multiplied by the measured input voltage to give greater weight to the current difference that occurs when the input voltage is at its peaks.

The process of FIG. 10 begins when a digital signal processor (e.g., the digital signal processor 126 of the digital control system 100 of FIG. 2 or the digital signal processor 244 of the digital control system 100 of FIG. 3) receives an input voltage signal (e.g., the input voltage signal $V_{AC}$) (block 1102). The digital signal processor determines if the input voltage signal is in a desired range (e.g., outside of a desired threshold) (block 1104). If the digital signal processor determines that the input voltage is not in the desired range (block 1104), the digital signal processor deactivates an integrator (e.g., the current share controller G3 of FIG. 4) (block 1110). In other words, the integrator stops accumulating the input and continues to output the last accumulated value. Control then proceeds to block 1108, which is described below.

If the digital signal processor determines that the input voltage signal is in the desired range (block 1104), the digital signal processor activates an integrator that accumulates the difference between the input signals of the phases of a control system (e.g., the current share controller G3, which integrates the difference between the current $I_{phB}$ and the current $I_{phA}$) (block 1106). The output of the integrator is added to a phase control signal for a control system (e.g., in the firmware of FIG. 4, the output of the current share controller G3 is added to the gate drive signal PWM1B) (block 1108). Control then returns to block 1104 to continue monitoring the input voltage signal.

G. Compensation Control

Figure 11:
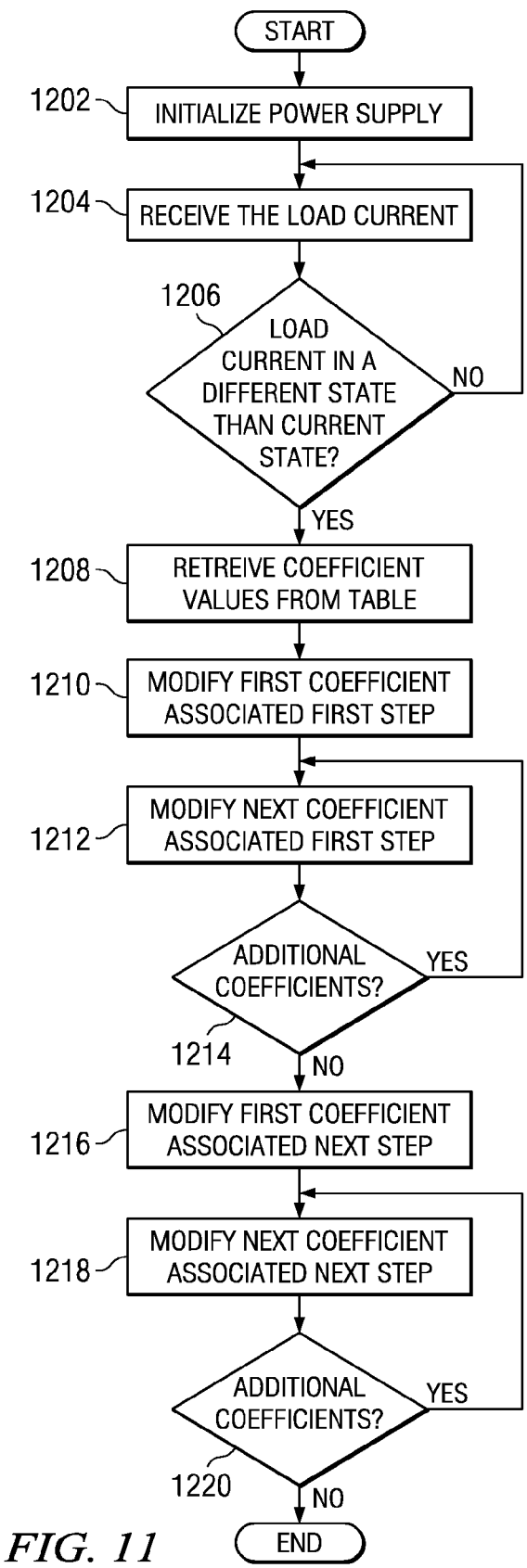
FIG. 11 is a flowchart illustrating an example process for modifying compensation of a control system based on a current signal.

FIG. 11 is a flowchart illustrating an example process for modifying compensation of a control system (e.g., the digital power supply 100 of FIGS. 2 and/or 3) based on a current signal (e.g., a current representative of current flowing through a load of the control system). Accordingly, the control system can adjust for changes in a load that result in a change in load current. The example process of FIG. 11 is configured to gradually adjust coefficient values and to adjust coefficient values sequentially.

The example process of FIG. 11 begins when a digital signal processor (e.g., the digital signal processor 126 of FIG. 2 or the digital signal processor 244 of FIG. 3) initializes the control system (e.g., a digital power supply) (block 1202). For example, the digital signal processor may cause the control system to receive and input signal and provide an output signal based on the input signal. The digital signal processor then receives a signal representative of the current flowing through a load of the digital signal processor (block 1204). The digital signal processor then determines if the received signal indicates that the load current is in a different state than a previous determination (block 1206). For example, the digital signal processor may determine if the value of the load current has substantially changed, if the peak values of the load current have substantially changed, if the average of the load current has substantially changed, etc. If the load current has not substantially changed (block 1206), control returns to block 1204 to continue monitoring the current.

If the load current has substantially changed (block 1206), the digital signal processor retrieves optimal controller coefficient values for the new state from a table of coefficient values (block 1208). For example a table of optimized coefficients may be pre-loaded onto memory associated with the digital signal processor. The table of optimized coefficients may include desirable coefficients (e.g., coefficients for the voltage loop compensator G4 of FIG. 5 and/or the regulator G2 of FIG. 4) for some or all of the possible values for the current signal. For example, the table may include a first set of coefficients for a first range of current values and a second set of coefficients for a second range of current values. The digital signal processor then modifies a first coefficient by changing the first coefficient to be a first step closer to the value retrieved from the table of coefficient values (block 1210). For example, the digital signal processor may determine the distance between the current coefficient value and the retrieved value and adjust the first coefficient one half the distance to the retrieved value. For example, if the first coefficient is currently set to 0.25 and the table of coefficients indicates that the first coefficient should be changed to 1.0, the digital signal processor will change the first coefficient to be 0.62.5.

Then, the digital signal processor modifies a next coefficient by changing the next coefficient to be a first step closer to a value retrieved from the table of coefficient values (block 1212). The first step used to modify the first coefficient and the first step used to modify the second coefficient may be the same or different depending on the implementation. The digital signal processor then determines if there are further coefficients to be modified (block 1214). If there are further coefficients to be modified (block 1214), control returns to block 1212 to continue modifying coefficients.

If there are no further coefficients to be modified (block 1214), the digital signal processor modifies the first coefficient to be equal to the value retrieved from the table of coefficient values (block 1216). The digital signal processor then modifies the next coefficient to be equal to the value retrieved from the table of coefficient values for the respective coefficient (block 1218). The digital signal processor then determines if there are further coefficients to be modified (block 1220). If there are further coefficients to be modified (block 1220), control returns to block 1218 to continue modifying coefficient values. If there are no further coefficients to be modified, the process of FIG. 11 is completed.

While the example process of FIG. 11 is configured to use a single intermediate step of coefficient values, any number of steps may be used. For example, in an alternative implementation, a coefficient may be stepped from an initial value to a first intermediate value, from the first intermediate value to a second intermediate value, and from the second intermediate value to a final value.

Figure 12:
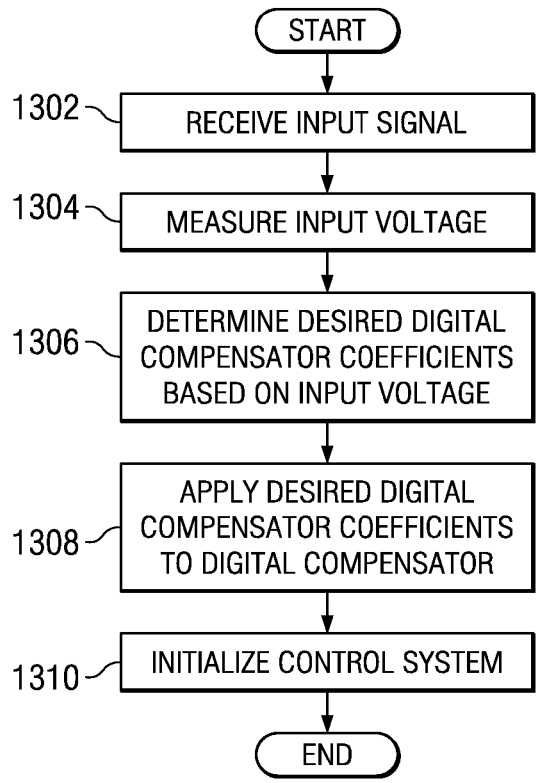
FIG. 12 is a flowchart illustrating an example process for controlling a control system based on an input to the control system.

FIG. 12 is a flowchart illustrating an example process for controlling a control system based on an input to the control system. The example process of FIG. 12 is configured to enable the control system to adjust system coefficients so that the control system can be optimized to function under varying input signal conditions (e.g., input signals having various frequencies, voltages, currents, etc.).

The process of FIG. 12 begins when a digital signal processor (e.g., the digital signal processor 126 of FIG. 2 or the digital signal processor 244 of FIG. 3) receives a signal representative of an input signal to a control system (e.g., the digital power supply 100 of FIGS. 2 and/or 3) (block 1302). The digital signal processor then measures the input signal to determine characteristics of the input signal (block 1304). For example, the digital signal processor may determine a voltage and frequency of the input signal.

The digital signal processor then determines desired coefficients for a digital signal compensator of the control system (e.g., the firmware illustrated in FIGS. 4 and/or 5) based on the characteristics of the input signal (block 1306). For example, the digital signal processor may include a table of optimized values that corresponds to expected signal characteristics. Alternatively, any other method of determining optimized coefficients may be used.

The digital signal processor then applies the desired coefficients to the digital signal compensator (block 1308). Then, the digital signal processor initializes the control system (block 1310). For example, the input signal may be measured before any output signal is provided by the control system. Accordingly, once desired coefficients for the control system are determined and applied, the control system may be operated to provide an output signal. The process of FIG. 12 then completes.

H. Control in Response to a Reference Change

Figure 13:
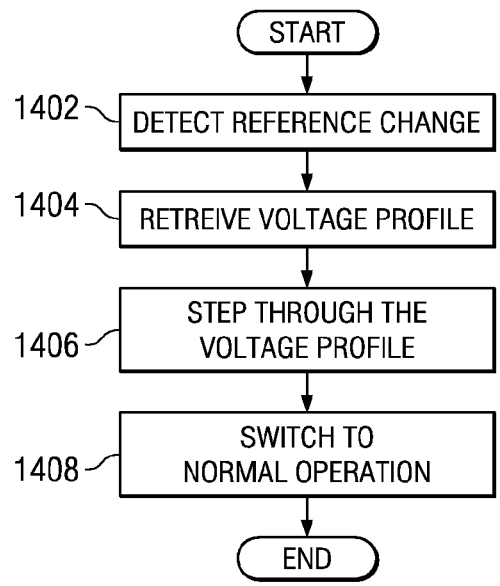
FIG. 13 is a flowchart illustrating an example process that may be used to control a control system in response to a change in a reference signal of the control system.

FIG. 13 is a flowchart illustrating an example process that may be used to control a control system in response to a change in a reference signal of the control system. The example process of FIG. 13 is configured to gradually adjust a reference signal to a changed value, rather than changing a reference signal instantly or almost instantly.

The process of FIG. 13 begins when a digital signal processor (e.g., the digital signal processor 126 of FIG. 2 or the digital signal processor 244 of FIG. 3) detects a change in a reference value or signal used in a control system (e.g., the digital power supply 100 of FIGS. 2 and/or 3) (block 1402). For example, reference voltage Vref may be changed from a first value to a second value. In an implementation where the reference voltage Vref is a value stored in a register, the value may be changed by a user using a user interface to modify the value. In an implementation where the reference voltage Vref is a signal received by a digital signal processor, the reference voltage Vref may be changed by modifying the system that supplies the reference voltage.

In response to determining that the reference voltage has changed (block 1402), the digital signal processor retrieves a voltage profile for the reference voltage change (block 1404). For example, the digital signal processor may store a voltage profile associated with various expected values for the reference voltage. Alternatively, the digital signal processor may calculate a voltage profile using a predetermined formula. For example, a voltage profile may be generated by determining a number of values between the current reference voltage and the updated voltage reference (e.g., for a current reference voltage of 1 Volt and an updated reference voltage of 5 Volts, the following values may be used: 1.8 Volts, 2.6 Volts, 3.4 Volts, 4.2 Volts, and 5 Volts). In another example, a voltage profile may start by accelerating slowly, speeding up, and then gradually approaching a target value (e.g., for a current reference voltage of 1 Volt and an updated reference voltage of 5 Volts, the following values may be used: 1.2 Volts, 1.4 Volts, 1.6 Volts, 1.8 Volts, 2.5 Volts, 3.2 Volts, 3.9 Volts, 4.2 Volts, 4.4 Volts, 4.6 Volts, 4.8 Volts, 4.9 Volts, 5 Volts).

After retrieving (or determining) the voltage profile, the digital signal processor steps through the voltage profile (block 1406). For example, the digital signal processor may apply a first value of the voltage profile, delay for 1 second, apply a next value of the voltage profile, delay for 1 second, etc. Once the digital signal processor has stepped through the voltage profile, the control system returns to operating in a normal mode (block 1408). In other words, once the voltage profile has been applied, the voltage reference will be at the updated voltage reference value and the control system will operate by basing an output voltage on the voltage reference. The process of FIG. 13 is then completed.

2. System Diagnostics and Analysis

The description in the following section is focused on techniques for diagnosing and analyzing the operation of a digital control system, such as the digital power supply 12 of the system 10 of FIG. 1. The techniques may be used to diagnosis and analyze the operation of the diagrams and flowcharts of section 1.

Figure 14:
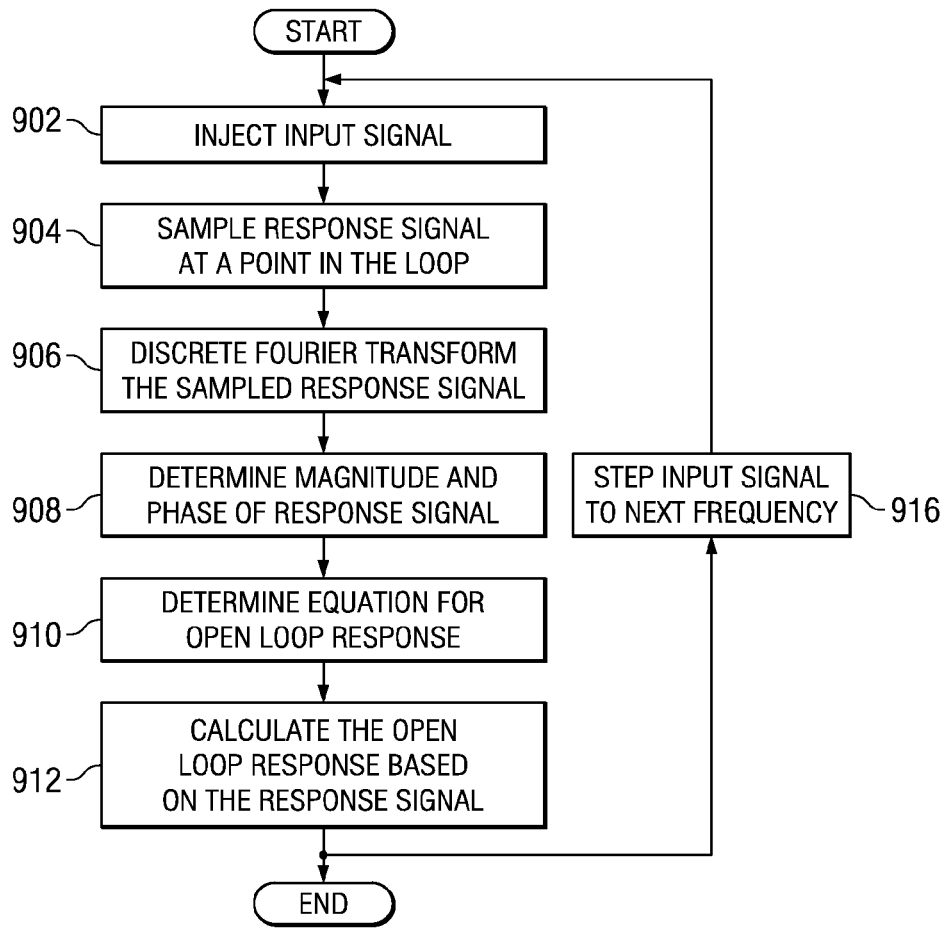
FIG. 14 is flowchart illustrating an example process for determining a transfer function in a closed loop control system.

FIG. 14 is flowchart illustrating an example process for determining a transfer function in a closed loop control system (e.g., the example closed loop control system 700 of FIG. 8). The example process of FIG. 14 begins when an input signal having a predetermined frequency is injected into the closed loop control system (block 902). For example, an input signal may be injected as input signal d1 or as input signal d2. The input signal may be a sine wave, a cosine wave, or any other type of signal. The input signal may be injected, for example, by a digital signal processor (e.g., the digital signal processor 126 of FIG. 2 and/or the digital signal processor 244 of FIG. 3). In an example implementation, the digital signal processor may include a table of pre-calculated values for the input signal.

After the input signal is injected, a signal in the control system is sampled to determine the response (block 904). For example, in the control system 700 of FIG. 8, the input signal may be injected as input signal d2 and the control signal c may be sampled or any other desired combination may be used. The response signal is discrete Fourier transformed at the predetermined frequency of the input signal (block 906). The definition of a discrete Fourier transform is:

$$K_k = \sum_{n=0}^{N-1} (V_n)\left(\cos\left(2\pi \frac{k}{N} n\right) - j\sin\left(\frac{k}{N} n\right)\right) \quad (9)$$

where $K_k$ is the discrete Fourier transform of the kth harmonic of the input signal, $V_n$ is the input signal, and N is the number of samples. Accordingly, the real and imaginary magnitude of the kth harmonic of a signal can be calculated by multiplying the signal by a cosine and sine at the harmonic frequency. According to the illustrated example, the sine and cosine sequences have already been determined for injecting the input signal.

One of the characteristics of the discrete Fourier transform formula is that only harmonics of the measurement interval are calculated. By limiting the measurement frequencies to harmonics there will always be an integer number of cycles over the measurement interval. When a frequency is chosen that generates a non-integer number of cycles over the measurement interval, the discrete Fourier transform algorithm will spread the signal energy over several frequencies, resulting in an error in the calculated magnitude. This phenomenon is called "leakage". Leakage can be compensated for by applying a window function to the measurement signal before multiplying by the sine and cosine reference sequences. An example window function is the triangular window:

$$w(n) = \frac{2}{N}\left(\frac{N}{2} - \left|n - \frac{N-1}{2}\right|\right) \quad (10)$$

Therefore, an example algorithm for measurement frequencies that are not harmonics is:

$$K_{meas} = \sum_{n=0}^{N-1} (w(n)v_n)\exp\left(-j2\pi \frac{F_{meas}}{F_s} n\right) \quad (11)$$

This equation implements a matched filter, which is not technically a discreet Fourier transform.

Alternatively, the measurement interval may be adjusted to guarantee an integer number of since cycles:

$$K_{meas} = \sum_{n=0}^{N-1} (v_n)\exp\left(-j2\pi \frac{F_{meas}}{F_s} n\right) \quad (12)$$

$$N = \text{round}\left(k \frac{F_s}{F_{meas}}\right)$$

where k is the number of cycles desired in the measurement interval.

Returning to FIG. 14, after the discrete Fourier transform or alternative transformation is performed, the magnitude and phase of the response signal is determined from the result of the discrete Fourier transform (block 908). Then, the equation for the open loop response for the closed loop control system and the combination of the injection point of the input signal and the measured response signal is determined (block 910). For example, as previously described, FIG. 21 illustrates the example equations for the open loop responses for the input and measurement points of the closed loop control system 700 of FIG. 8. According to FIG. 21, the equation for the open loop response for the closed loop control system 700 with the input signal injected at d2 measured by sampling the control signal c is:

$$GH = \frac{-c}{c + d_2} \quad (13)$$

Using the determined magnitude and phase response and the determined equation for the open loop response of the system, the open loop response is calculated (block 912). For example, using equation 13 and defining d2 to be real (i.e., having no imaginary component), the open loop response is calculated according to:

$$GH = -\frac{c_r^2 + c_i^2 + c_r d_r}{c_r^2 + c_i^2 + 2c_r d_r + d_r^2} - j\frac{c_i d_r}{c_r^2 + c_i^2 + 2c_r d_r + d_r^2} \quad (14)$$

where $c_r$ is the real component of the measured response, $c_i$ is the imaginary component of the measured response, and $d_r$ is the real component of the injected input signal. The magnitude of the gain and the phase shift may be plotted on a bode plot. For example, a graphical user interface (GUI) may be generated to display the bode plot to a user.

To determine the response of the system at a second frequency, the input signal is stepped to the next frequency or an alternative frequency (block 914). Then, control returns to block 902 to inject the signal at the next frequency and sample the response. Once a desired number of response values have been determined, the process of FIG. 14 ends.

While FIG. 14 illustrates a process in which the open loop response is calculated as closed loop data is collected at multiple frequencies, the open loop response may alternatively be calculated after all closed loop data has been collected. In other words, the process would loop through block 916 after block 908 until all closed loop values have been collected. Then, blocks 910 and 912 would be executed to calculate the open loop response. The calculation of the open loop response may be performed by a DSP or any other system to which the data can be sent.

Figure 15:
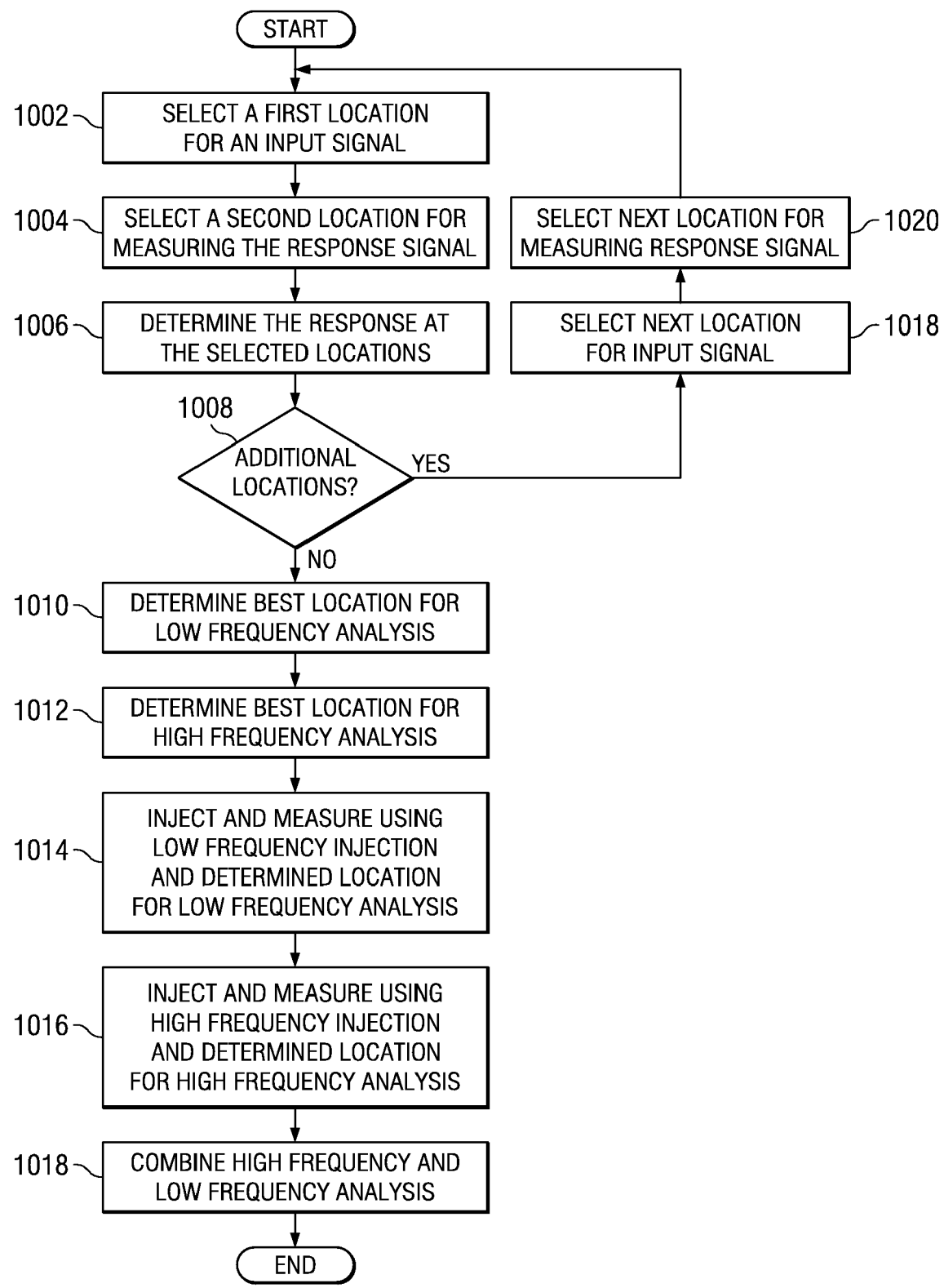
FIG. 15 is a flowchart illustrating an example process for determining a transfer function of a digital control system.

FIG. 15 is a flowchart illustrating an example process for determining a transfer function of a digital control system (e.g., the example closed loop control system 700 of FIG. 8). The process of FIG. 15 begins when the digital signal processor (e.g., the digital signal processor 216 FIG. 2 or the digital signal processor 244 of FIG. 3) selects a first location to inject an input signal in a control loop of the digital control system 100 of FIGS. 2 and/or 3 (block 1002). For example, the control signal may be injected as input signal d1 or input signal d2 of the control system 700 of FIG. 8.

Then, the digital signal processor selects a second location to measure the response signal (block 1004). The digital signal processor determines the magnitude and phase of the response of the combination of the first location and the second location (block 1006). For example, the magnitude and phase may be determined according to the process illustrated by the flowchart of FIG. 14. The digital signal processor then determines if there are further locations at which an input signal can be injected and/or at which a response signal can be measured (block 1008). If there are no further locations (block 1008), control proceeds to block 1010. If there are further locations (block 1008), the digital signal processor selects the next input signal location (block 1018). The digital signal processor then selects the next location for measuring the response signal (block 1020). Control then returns to block 1002 to determine the response for the combination of input signal location and response signal location. In an example implementation, the digital signal processor measures the response signal at each response signal location for each input signal location. Accordingly, the response of each combination of input signal and response signal location is determined.

After determining the response for all desired combinations of input signal and response signal locations, the digital signal processor determines the most desirable combination for low frequency analysis (block 1010). For example, a first combination may result in substantial attenuation of the input signal when measured at the response signal location for low frequency inputs. A second combination may result in a substantial gain (or smaller attenuation) of the input signal when measured at the response signal location for low frequency inputs. For example, the graph in FIG. 22 shows that a response labeled M04 has a greater gain than a response labeled M02, until a point labeled 2202. Accordingly, it may be desirable to measure the response of the digital control system to low frequency inputs using the second combination. Using combinations with less attenuation and/or higher gains may result in a high signal to noise ratio in the measured response signal instead of injecting an input signal having greater amplitude, which may result in more than desirable disturbance of the digital control system.

Then, the digital signal processor determines the most desirable combination for high frequency analysis (block 1012). Similar to the low frequency determination, the combination of input signal location and response signal location that results in the greatest gain or least attenuation of the input signal may be the most desirable location.

After determining the most desirable low frequency location and the most desirable high frequency location, the digital signal processor injects low frequency signals and measures the response using the combination of input signal location and response signal location that was selected in block 1010 (block 1014). For example, the process of FIG. 14 may be used to determine the response to input signals having a frequency between 100 Hz and 10 kHz.

Then, the digital signal processor injects high frequency signals and measures the response using the combination of input signal location and response signal location that was selected in block 1012 (block 1016). For example, the process of FIG. 14 may be used to determine the response to the input signals having a frequency between 10 kHz and 1 GHz. Then, the low frequency response and the high frequency response are combined to create the frequency response for the entire analyzed frequency spectrum (block 1018). The entire analyzed frequency spectrum response may be analyzed by the digital control system and/or displayed in a bode plot such as, for example, using the graphical user interface illustrated in FIG. 18. The process of FIG. 15 is then complete.

While the example process of FIG. 15 includes process steps to determine the response characteristics of various injection and data measurement points, including determining appropriate frequency ranges for analyzing combinations of injection and measurement points, this information may alternatively be determined by modeling or by cycling through the entire frequency range using each set of measurement points.

A. User Interfaces

FIG. 16 is an illustration of an example graphical user interface that may be provided to users of a digital control system (e.g., the digital power supply 100 of FIGS. 2 and/or 3). The example graphical user interface of FIG. 16 displays parameters of interest associated with the operation of a digital control system. A digital control system may not include physical points at which all parameters in a system can be measured. Rather, many parameters are digital values that are stored in registers and used in computations inside of a digital signal processor. Accordingly, the example graphical user interface of FIG. 16 is configured to display the internal (and/or sampled external) parameters to users for analysis, troubleshooting, configuration, etc. In an example implementation, a digital control system may periodically retrieve operational parameters of the control system and store the value in an available memory (e.g., a circular buffer). In an example implementation, the control system retrieves and stores the values at a rate that is a multiple of the rate at which control loops of the digital control system operate. The stored values are then graphically displayed using the graphical user interface of FIG. 16.

The example graphical user interface of FIG. 16 is configured to display a line representing the current flowing in a power factor controller (e.g., current signal $I_{PFC}$ measured in the PFC 106 of FIG. 3) 1514, a line representing a boost voltage ripple of an output of a power factor controller 1516, a line representing a current command reference current (e.g., reference current command Iref of FIG. 4) 1518, and a line representing a voltage signal input to a power factor controller (e.g., voltage signal $V_{AC}$ of FIG. 3) 1520. The graphical user interface includes a set of radio buttons 1502 that enable one or more of the displayed lines to be hidden from display. In alternative implementations, any other parameters of interest may be tracked and displayed using the graphical user interface of FIG. 16. Additionally, the graphical user interface may include a drop down box (or other graphical user element) that allows users to select parameters for display from among all parameters available in a digital control system.

The example graphical user interface of FIG. 16 includes a start button 1504, a get trace button 1505, a decimate count 1506, a plot type selection 1508, an x-axis scale selection 1510, and a y-axis scale selection 1512. The start button 1504 of the illustrated example, enables a user to start and stop the display of lines. Once the start trace button is pressed, the button changes to read "stop trace" and the selected parameters are traced and displayed in the graph of the graphical user interface of FIG. 16. In the illustrated example, once the traced lines reach the right-most edge of the graph, the graph slides to the left so that the most recently traced lines are always displayed. Alternatively, the graph may be erased once the lines reach the right-most edge and the lines may be re-started at the left-most edge of the graph or tracing may automatically stop when the lines reach the right-most edge of the graph. Once the user clicks the start button 1504 again (i.e., while the start button 1504 reads "stop trace"), the trace recording and display is stopped and the lines continue to be displayed on the graph in the state that they were in when the start button 1504 was pressed.

The example get trace button 1505 causes a digital control system to transmit a stored trace of the length specified in the x-axis scale selection 1510 and to display the trace in the graph of the graphical user interface of FIG. 16. For example, in the illustrated example, the x-axis selection 1510 is set to display from time 0 to 40.94 milliseconds. Accordingly, in the example graphical user interface, if the get trace button 1505 is pressed, the digital control system will be initialized and run for 40.94 milliseconds while the parameters of interest are traced. This parameter tracing will generate one graph worth of data and then stop the tracing process.

While two example methods of initiating tracing and display of system parameters are described in the forgoing, any method of initiating tracing and display may be used. For example, tracing initiating if a system error occurs so that a user may see how the system responds to the error, tracing may be initiated in response to a user command (e.g., tracing may be imitated when an input voltage is stepped so that the step response of the system may be analyzed), etc. In addition, the termination of tracing may be effected as desired. For example, tracing may be terminated when a system error occurs so that a user may view the parameters during the time leading up to the error or tracing may be terminated when the buffer is filled.

The decimate count 1506 of the illustrated example is a text box that allows a user to input a decimate value to be applied to the trace data. If the decimate count 1506 is set to 0, no decimation is performed (i.e., every sample is collected). However, if a decimation value is input, 1 sample is stored and displayed and then the number of samples specified by the decimate count 1506 are skipped (i.e., ignored). For example, if the decimate count 1506 is set to 1, every other sample (i.e., 1 out of 2 samples) will be stored and displayed The plot type selection 1508 of the illustrated example allows a user to pick between a single graph type (shown in FIG. 16) or a quad graph type (shown in FIG. 17). In other words, the plot type selection 1508 allows a user to select whether each line (1514-1520) is displayed overlaid over each other (single graph type) or each line (1514-1520) is displayed on its own separate graph (quad graph type). While single graph type and quad graph type options are illustrated in the example plot type selection 1508, any number of graph types may be provided. For example, a dual graph type, a triple graph type, etc. In addition, any combination of overlaid and separate graph types may be used. For example, a first graph may include two line overlaid while a second graph may show only a single line.

The x-axis selection 1510 allows a user to input a minimum and maximum value for the x-axis of the graph of the example graphical user interface illustrated in FIG. 16. The x-axis selection 1510 additionally includes a reset button to reset the values to default values. While the x-axis is shown as a manually configurable range, the range may alternatively be automatically configured by the digital control system. For example, the range may automatically be determined based on a rate at which control loops of the control system run.

The y-axis selection 1512 of the illustrated example allows a user to configure y-axis scale and offset for each of the displayed lines (1514-1520). Each line may have different scales and offsets depending on the measured values and any hardware scaling that is performed. Accordingly, the y-axis selection 1512 allows a user to configure the relative ranges of each line by configuring the scale and offset value. For example, it may be desirable to display a first current signal have a peak-to-peak value of 5 Amps on the same graph and with the same relative size as a second current signal having a peak-to-peak value of 25 Amps. Accordingly, by decreasing the y-axis range of the second current signal, the relative size of the second current signal can be reduced so that the first current signal and the second current signal both fit on a single graph and neither line is undesirably small or large. The y-axis selection 1512 includes a reset button to reset the values to default values. In addition, the y-axis selection 1512 includes an auto button to allow a user to request that the system automatically configure the scale and offset values for each signal. For example, the system may set the scale and offset so that no lines are cutoff at the top or bottom of the graph and so that the lines are approximately centered on the center of the graph of the graphical user interface of FIG. 16.

Figure 17:
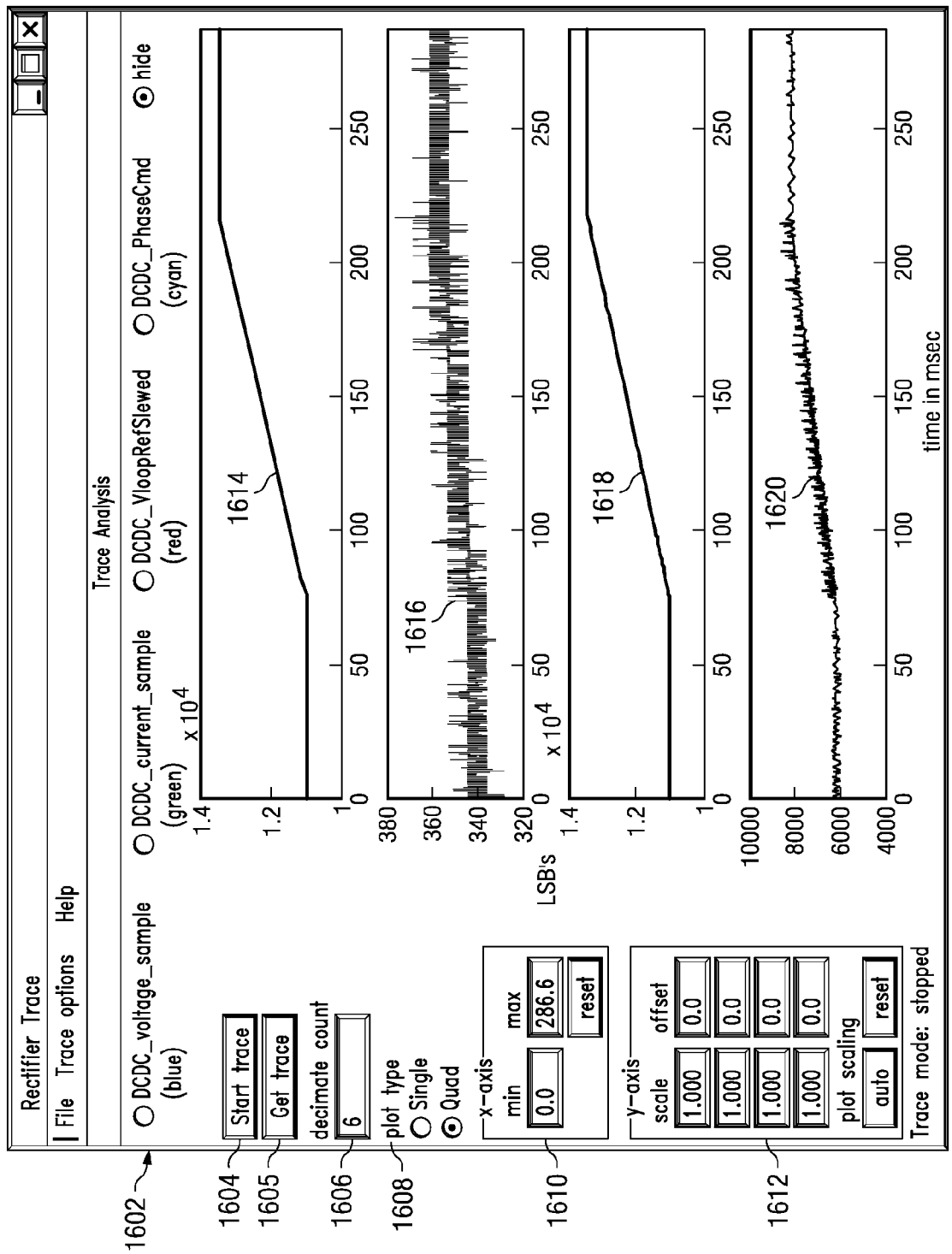
FIG. 17 is an illustration of an example graphical user interface displaying diagnostic and operational parameters that may be provided to users of a digital control system.

FIG. 17 is an illustration of an example graphical user interface that may be provided to users of a digital control system (e.g., the digital power supply 100 of FIGS. 2 and/or 3). FIG. 17 is configured to display a line representative of a voltage input to a DC to DC converter (e.g., the voltage signal $V_{BOOST}$ input to the DC to DC converter 110 of FIG. 3) 1614, a line representative of a current input to the DC to DC converter (e.g., the current signal $I_{PRI}$ of FIG. 3) 1616, a line representative of a reference voltage signal applied to the DC to DC converter (e.g., the reference voltage signal Vref of FIG. 4) 1618, and a line representative of a phase command (e.g., the output of the controller Pm of FIG. 5) 1620. The graphical user interface of FIG. 17 includes a set of radio buttons 1602 that allow a user to hide or display a list of all traceable parameters.

The graphical user interface of FIG. 17 includes a start button 1604, a get trace button 1605, a decimate count 1606, a plot type selection 1608, an x-axis selection 1610, and a y-axis selection 1612, which may be similar to the start button 1504, the get trace button 1505, the decimate count 1506, the plot type selection 1508, the x-axis selection 1510, and the y-axis selection 1512. Accordingly, these features are not described in further detail herein.

Figure 18:
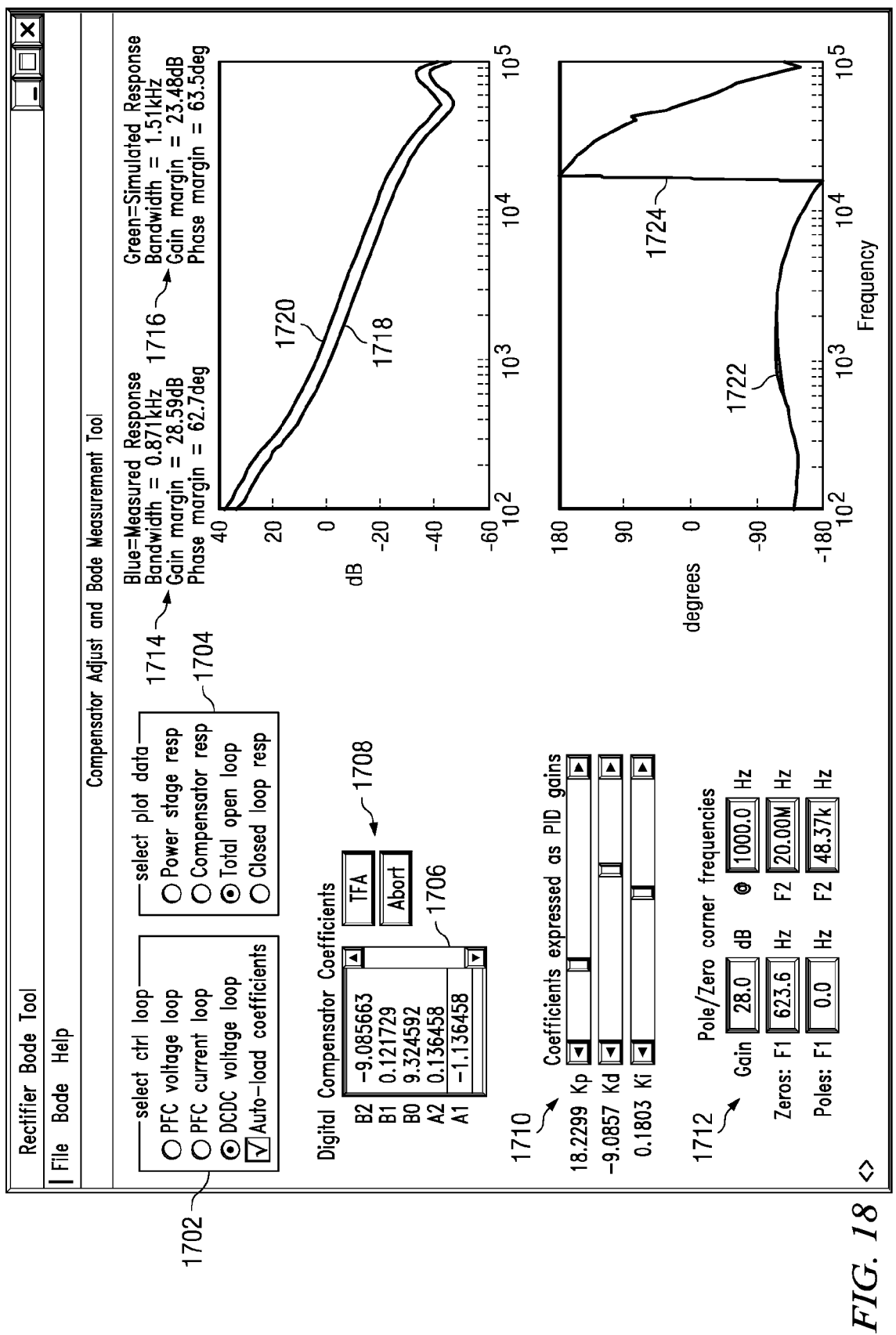
FIG. 18 is an illustration of an example graphical user interface displaying diagnostic and operational parameters that may be provided to users of a digital control system.

FIG. 18 is an illustration of an example graphical user interface that may be provided to users of a digital control system (e.g., the digital power supply 100 of FIGS. 2 and/or 3). The example graphical user interface of FIG. 18 is configured to allow a user to adjust operating parameters of a digital control system and to display analytical information about the operation of the digital control system.

The example graphical user interface of FIG. 18 includes a control loop selection 1702, a plot data selection 1704, a coefficient configuration 1706, a transfer function control 1708, a proportional-integral-derivative (PID) gain configuration 1710, a pole/zero configuration 1712, a measured response evaluation display 1714, a simulated response evaluation display 1716, a measured response magnitude plot 1718, a simulated response magnitude plot 1720, a measured response phase plot 1722, and a simulated response phase plot 1724.

The control loop selection 1702 of the illustrated example allows a user to select a desired control loop for configuration and analysis. The example control loop 1702 allows a user to select a PFC voltage control loop (e.g., the control loop including the voltage loop compensator G1 of FIG. 4), a PFC current control loop (e.g., the control loop including the regulator G2 of FIG. 4), or a DC to DC converter control loop (e.g., the controller, G4, of FIG. 5). In addition, the control loop selection 1702 includes a checkbox that allows a user to select whether the user desires that the current coefficients in the GUI be written to the DSP (e.g., the DSP 126 of FIG. 2 and/or the DSP 244 of FIG. 3) of the control loop be loaded (e.g., retrieved from the registers in which they are currently stored).

The plot data selection 1704 of the illustrated example allows a user to select which data is displayed on the plots (1718-1724). The example plot data selection 1704 allows a user to select the response of a power stage (e.g., the PFC 106 of FIGS. 2 and/or 3), the response of a compensator (e.g., the controller pictured in the firmware diagram of FIG. 4), the open loop response of a complete system (e.g., the open loop response for a system implemented according to the block diagram of FIG. 8), the closed loop response of a complete system (e.g., the closed loop response for a system implemented according to block diagram of FIG. 8).

The coefficient configuration 1706 of the illustrated example allows a user to view the controller coefficients for the control loop selected using the control loop selection 1702. In addition, the coefficient configuration 1706 may allow a user to input desired coefficients for the controller of the control loop. The illustrated example provides coefficients for a two pole/two zero controller (e.g., $Y(n)=B0*X(n)+B1*X(n-1)+B2*X(n-2)-A1*Y(n-1)-A2*Y(n-2)$)

The control buttons 1708 of the illustrated example allows a user to start and stop a transfer function analysis (e.g., a transfer function analysis performed according to the process of FIG. 14). For example, when the button labeled TFA is pressed, the control system measures the response of the control loop selected in the control loop selection 1702 and plots the result specified in the plot data selection 1704 as the measured response magnitude plot 1718 and the measured response phase plot 1722. The control system also determines the simulated or predicted response of the control system to the control parameters specified by one or more of the coefficient configuration 1706, PID gain configured 1710, or the pole/zero configuration 1712 and displays the simulated response as the simulated response magnitude plot 1720 and the simulated response phase plot 1724.

There are three ways to modify the controller coefficients of the example digital control system described herein: (1) By directly modifying the coefficients, (2) by modifying PID gains that cause the coefficients to be changed, or (3) by establishing poles and zeroes that cause the changing of coefficients to match the poles and zeros. When the coefficients are modified using any one of the methods, the values for the other methods can be calculated using simulated response analysis output and plots.

The PID gain configuration 1710 of the illustrated example allows a user to view the controller settings as PID gain values for the control loop selected using the control loop selection 1702. In addition, the PID gain configuration 1710 may allow a user to input desired PID gain values for the controller of the control loop. For example, if a user changes a value in the coefficient configuration 1706, the PID gain 1710 will be updated to show the corresponding PID gain values and vice versa.

The pole/zero configuration 1712 of the illustrated example allows a user to view the controller settings as a gain and pole and zero values for the control loop selected using the control loop selection 1702. In addition, the pole/zero configuration 1712 may allow a user to input desired pole and zero values for the controller of the control loop. For example, if a user changes a value in the coefficient configuration 1706, the pole/zero configuration 1712 will be updated to show the corresponding gain, pole, and zero values and vice versa.

The measured response display 1714 of the illustrated example shows the bandwidth, gain margin, and phase margin calculated from the measured response data. The values of the measured response display 1714 may be determined by analyzing the magnitude and phase values generated by the process of FIG. 14.

Figure 19:
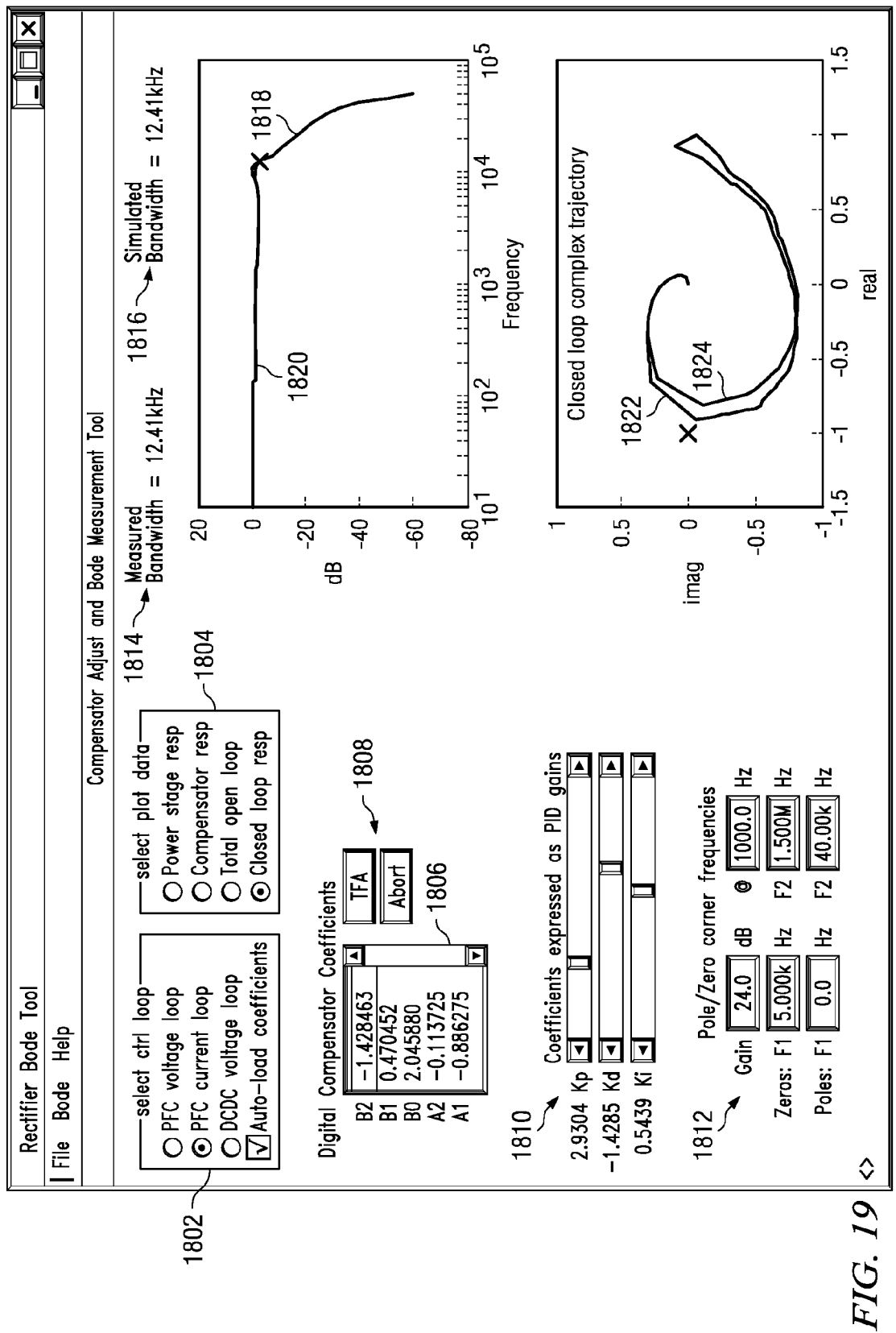
FIG. 19 is an illustration of an example graphical user interface displaying diagnostic and operational parameters that may be provided to users of a digital control system.

The simulated response display 1716 of the illustrated example shows the bandwidth, gain margin, and phase margin for the simulated response of selected control system parameters when combined with the measured plant data. The values of the simulated response display 1716 may be determined from FIG. 19 is an illustration of an example graphical user interface that may be provided to users of a digital control system (e.g., the digital power supply 100 of FIGS. 1 and/or 2). The example graphical user interface of FIG. 19 is configured to allow a user to adjust operating parameters of a digital control system and to display analytical information about the operation of the digital control system.

The example graphical user interface of FIG. 19 includes a control loop selection 1802, a plot data selection 1804, a coefficient configuration 1806, a transfer function control 1808, a proportional-integral-derivative (PID) gain configuration 1810, a pole/zero configuration 1812, a measured response display 1814, a simulated response display 1816, a measured response magnitude plot 1818, a simulated response magnitude plot 1820, a measured response phase plot 1822, and a simulated response phase plot 1824, which may be similar to the control loop selection 1702, the plot data selection 1704, the coefficient configuration 1706, the transfer function control 1708, the proportional-integral-derivative (PID) gain configuration 1710, the pole/zero configuration 1712, the measured response display 1714, the simulated response display 1716, the measured response magnitude plot 1718, the simulated response magnitude plot 1720, the measured response phase plot 1722, and the simulated response phase plot 1724 of FIG. 18. However, in FIG. 19 illustrates an example graphical user interface having different settings selected for the control loop selection 1802 and the plot data selection 1804 than the corresponding settings in the graphical user interface of FIG. 18. As shown in the graphical user interface of FIG. 19, the example graphical user interface includes a nyquist plot of a closed loop response instead of a bode plot for displaying the measured response phase plot 1822 and the simulated response phase plot 1824.

While the forgoing description and figures illustrate graphical user interfaces having example graphic user interface elements, any type of graphical user interface elements may be used. For example, several check boxes may be substituted for a radio button, clickable text may be substituted for a button, a drop down menu may be substituted for a scroll bar, etc. In addition, the graphical user interface may be implemented partially or fully as a command line interface in which a user may input commands at a command prompt and receive response values and parameters. In addition, while the example graphical user interfaces are provided as a frontend to a system implemented using Matlab®, the graphical user interfaces may be implemented using any type of user interface such as, for example, a webpage, a compiled program graphical user interface, etc. Any type of graphical user interface elements may be used such as, for example, any combination of checkboxes, drop down lists, text boxes, buttons, radio buttons, icons, scroll bars, etc. may be used.

B. Example Computer

Figure 23:
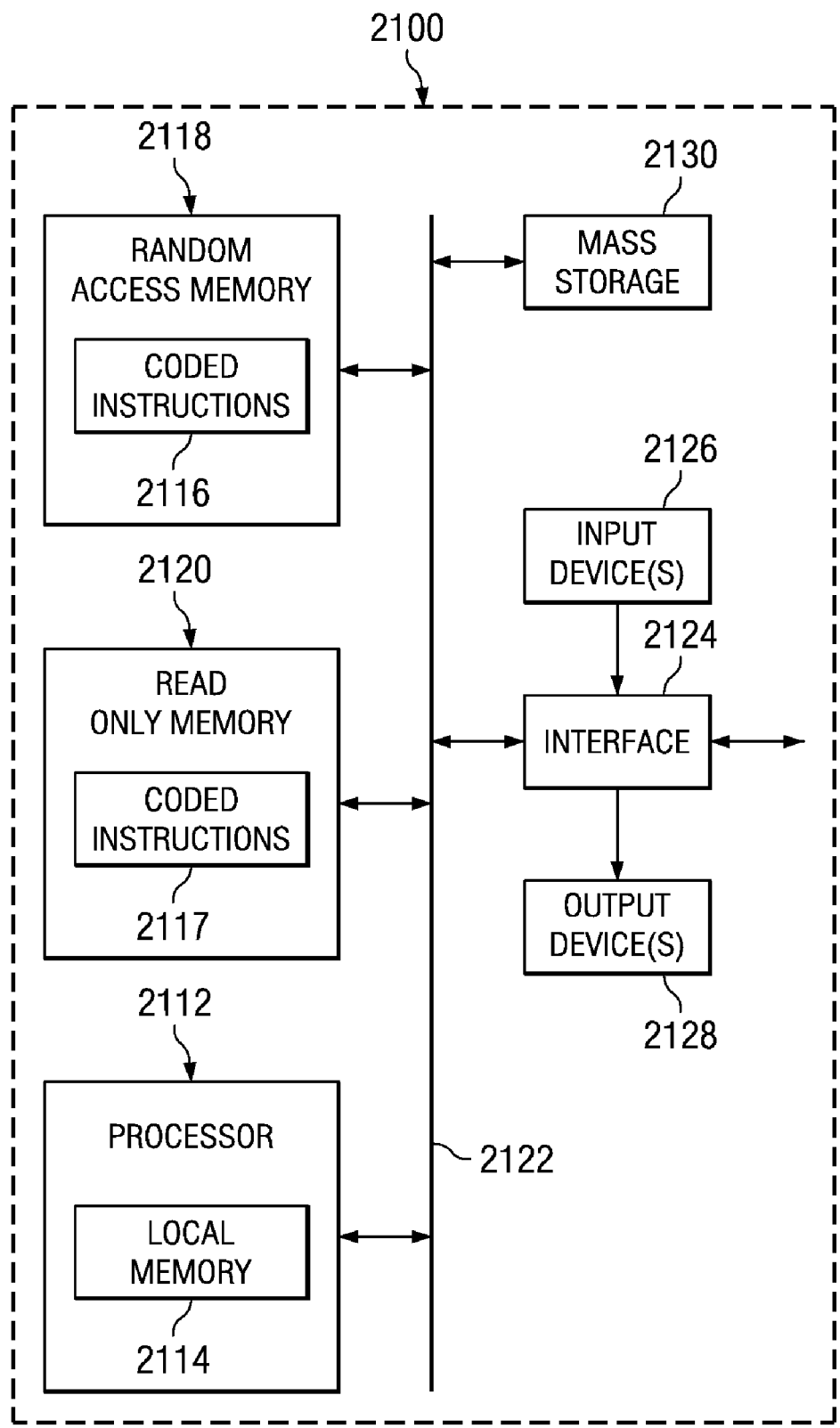
FIG. 23 is a block diagram of an example computer 2100 capable of executing the processes illustrated by the flowcharts in FIGS. 8, 9, 10, 11, 12, 13, and 14 to implement the apparatus and methods disclosed herein

FIG. 23 is a block diagram of an example computer 2100 capable of executing the processes illustrated by the flowcharts in FIGS. 8, 9, 10, 11, 12, 13, and 14 to implement the apparatus and methods disclosed herein.

The system 2100 of the instant example includes a processor 2112 such as a general purpose programmable processor. The processor 2112 includes a local memory 2114, and executes coded instructions 2116 present in random access memory 2118, coded instruction 2117 present in the read only memory 2120, and/or instructions present in another memory device. The processor 2112 may execute, among other things, the machine-readable instructions represented in FIGS. 8, 9, 10, 11, 12, 13, and 14. The processor 2112 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2112 is in communication with a main memory including a volatile memory 2118 and a non-volatile memory 2120 via a bus 2125. The volatile memory 2118 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2120 may be implemented by flash memory and/or any other desired type of memory device. Access to the main memory 2118, 2120 is typically controlled by a memory controller (not shown) in a conventional manner.

The computer 2100 also includes a conventional interface circuit 2124. The interface circuit 2124 may be implemented by any type of well known interface standard, such as an Ethernet interface, a universal serial bus (USB), and/or a third generation input/output (3GIO) interface.

One or more input devices 2126 are connected to the interface circuit 2124. The input device(s) 2126 permit a user to enter data and commands into the processor 2112. The input device(s) can be implemented by, for example, a keyboard, a mouse, a touchscreen, a track-pad, a trackball, isopoint and/or a voice recognition system.

One or more output devices 2128 are also connected to the interface circuit 2124. The output devices 2128 can be implemented, for example, by display devices (e.g., a liquid crystal display, a cathode ray tube display (CRT), a printer and/or speakers). The interface circuit 2124, thus, typically includes a graphics driver card.

The interface circuit 2124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 2100 also includes one or more mass storage devices 2130 for storing software and data. Examples of such mass storage devices 2130 include floppy disk drives, hard drive disks, compact disk drives and digital versatile disk (DVD) drives.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software (e.g., Matlab®), exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for handling a reference voltage change in a digital power supply, the method comprising:
   receiving a first value associated with a first reference voltage having a first voltage magnitude at a digital signal processor of a digital power supply;
   comparing the first reference voltage to an output voltage of the digital power supply;
   controlling the digital power supply based on the comparison between the first reference voltage and the output voltage;
   receiving a second value associated with a second reference voltage having a second voltage magnitude;
   determining that the first voltage magnitude is different than the second voltage magnitude;
   in response to determining that the second voltage magnitude is different than the first voltage magnitude, determining a voltage profile that identifies two or more intermediate voltage magnitudes between the first voltage magnitude and the second voltage magnitude; and
   controlling the digital power supply based on the two or more intermediate voltage magnitudes.

2. A method as defined in claim 1, wherein the voltage profile is a series of intermediate values.

3. A method as defined in claim 2, further comprising comparing the first voltage magnitude to the second voltage magnitude, wherein a voltage profile is selected from a plurality of voltages profiles based on the comparison between the first magnitude and the second magnitude.

4. A method as defined in claim 3, wherein comparing the first voltage magnitude to the second voltage magnitude comprises determining a difference in voltage magnitude between the first voltage magnitude and the second voltage magnitude and selecting from the plurality of voltage profiles comprises selecting the voltage profile associated with a voltage magnitude similar to the difference in voltage magnitude between the first voltage magnitude and the second voltage magnitude.

5. A method as defined in claim 1, wherein the voltage profile is defined by an equation that defines the two or more intermediate voltage magnitudes.

6. A method as defined in claim 5, wherein the equation defines a first one of the two or more intermediate voltage magnitudes for a first index and a second one of the two or more intermediate voltage magnitudes for a second index.

7. A method as defined in claim 1, wherein a first subset of the two or more intermediate voltage magnitudes varies at a first rate and a second subset of the two or more intermediate voltage magnitudes varies at a second rate.

8. A method as defined in claim 7, wherein the first subset comprises consecutive values and the second subset comprises consecutive values.

9. A method as defined in claim 7, wherein the first subset comprises values that are closer to the first voltage magnitude than values of the second subset.

10. A method as defined in claim 1, wherein controlling the digital power supply based on the two or more intermediate voltage magnitudes comprises using the two or more intermediate voltage magnitudes as reference voltages for the digital power supply.

11. A system comprising:
    a voltage source to output a source voltage;
    a digital power supply to:
    receive the source voltage;
    process the source voltage using a power factor controller and a direct current (DC) to DC converter to generate an output voltage;
    process the output voltage using a signal processor to generate control signals based on received instructions;
    control the power factor controller and the DC to DC converter using the control signals;
    receive a first value associated with a first reference voltage having a first voltage magnitude at a digital signal processor of a digital power supply;
    compare the first reference voltage to an output voltage of the digital power supply;
    control the digital power supply based on the comparison between the first reference voltage and the output voltage;
    receive a second value associated with a second reference voltage having a second voltage magnitude;
    determine that the first voltage magnitude is different than the second voltage magnitude;
    in response to determining that the second voltage magnitude is different than the first voltage magnitude, determine a voltage profile that identifies two or more intermediate voltage magnitudes between the first voltage magnitude and the second voltage magnitude;
    control the digital power supply based on the two or more intermediate voltage magnitudes; and
    a workstation to:
    send the first value associated with the first reference voltage;
    send the second value associated with the second reference voltage; and
    a powered apparatus to receive the output voltage and to use the output voltage to power the powered apparatus.

12. A system as defined in claim 11, wherein the voltage profile is a series of intermediate values.

13. A system as defined in claim 12, wherein the digital power supply is further to compare the first voltage magnitude to the second voltage magnitude, wherein a voltage profile is selected from a plurality of voltages profiles based on the comparison between the first magnitude and the second magnitude.

14. A system as defined in claim 13, wherein comparing the first voltage magnitude to the second voltage magnitude comprises determining a difference in voltage magnitude between the first voltage magnitude and the second voltage magnitude and selecting from the plurality of voltage profiles comprises selecting the voltage profile associated with a voltage magnitude similar to the difference in voltage magnitude between the first voltage magnitude and the second voltage magnitude.

15. A system as defined in claim 11, wherein the voltage profile is defined by an equation that defines the two or more intermediate voltage magnitudes.

16. A system as defined in claim 15, wherein the equation defines a first one of the two or more intermediate voltage magnitudes for a first index and a second one of the two or more intermediate voltage magnitudes for a second index.

17. A system as defined in claim 11, wherein a first subset of the two or more intermediate voltage magnitudes varies at a first rate and a second subset of the two or more intermediate voltage magnitudes varies at a second rate.

18. A system as defined in claim 17, wherein the first subset comprises consecutive values and the second subset comprises consecutive values.

19. A system as defined in claim 17, wherein the first subset comprises values that are closer to the first voltage magnitude than values of the second subset.

20. A machine-readable medium storing machine-readable instructions that, when executed, cause a machine to:
- receive a first value associated with a first reference voltage having a first voltage magnitude at a digital signal processor of a digital power supply;
- compare the first reference voltage to an output voltage of the digital power supply;
- control the digital power supply based on the comparison between the first reference voltage and the output voltage;
- receive a second value associated with a second reference voltage having a second voltage magnitude;
- determine that the first voltage magnitude is different than the second voltage magnitude;
- in response to determining that the second voltage magnitude is different than the first voltage magnitude, determine a voltage profile that identifies two or more intermediate voltage magnitudes between the first voltage magnitude and the second voltage magnitude; and
- control the digital power supply based on the two or more intermediate voltage magnitudes.

* * * * *